(12) United States Patent
Ramirez et al.

(10) Patent No.: US 11,563,596 B2
(45) Date of Patent: *Jan. 24, 2023

(54) SYSTEMS AND METHODS FOR PREEMPTIVELY PREVENTING INTERRUPTIONS FROM NETWORK-CONNECTED DEVICES FROM OCCURRING DURING MEDIA VIEWING

(71) Applicant: Rovi Guides, Inc., San Jose, CA (US)

(72) Inventors: Maria Rocio Ramirez, Belmont Hills, PA (US); Denisse Breaux, Lansdale, PA (US); Angel Merced, Wilmington, DE (US)

(73) Assignee: Rovi Guides, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/196,551

(22) Filed: Mar. 9, 2021

(65) Prior Publication Data

US 2021/0273821 A1 Sep. 2, 2021

Related U.S. Application Data

(63) Continuation of application No. 16/574,406, filed on Sep. 18, 2019, now Pat. No. 10,979,244, which is a continuation of application No. 15/936,827, filed on Mar. 27, 2018, now Pat. No. 10,461,955.

(51) Int. Cl.
*H04L 12/28* (2006.01)

(52) U.S. Cl.
CPC ...... *H04L 12/2827* (2013.01); *H04L 12/2838* (2013.01)

(58) Field of Classification Search
None
See application file for complete search history.

(56) References Cited

U.S. PATENT DOCUMENTS

| | | | |
|---|---|---|---|
| 9,167,196 B2* | 10/2015 | Woods | H04N 5/76 |
| 9,307,278 B2* | 4/2016 | Ellis | H04N 21/4583 |
| 9,848,161 B2* | 12/2017 | Krakirian | H04N 5/782 |
| 9,948,966 B1* | 4/2018 | Panchaksharaiah | H04N 21/26283 |
| 10,461,955 B2* | 10/2019 | Ramirez | H04L 12/2827 |
| 10,909,505 B2* | 2/2021 | Sreedhara | G06F 16/29 |
| 10,979,244 B2* | 4/2021 | Ramirez | H04L 12/2838 |
| 2004/0139047 A1* | 7/2004 | Rechsteiner | H04N 21/47214 |
| 2009/0276805 A1* | 11/2009 | Andrews, II | H04N 21/435 725/38 |
| 2014/0188485 A1* | 7/2014 | Kim | G10L 21/00 704/275 |
| 2014/0235282 A1* | 8/2014 | Kansal | H04L 51/043 455/466 |
| 2015/0143409 A1* | 5/2015 | Maughan | H04N 21/4668 725/34 |
| 2016/0191990 A1* | 6/2016 | McCarthy, III | H04N 21/4882 725/80 |

(Continued)

*Primary Examiner* — Lonnie V Sweet
(74) *Attorney, Agent, or Firm* — Haley Guiliano LLP

(57) ABSTRACT

Systems and methods are provided herein for preventing interruptions to a media viewing activity caused by operations performed in a household by network-connected devices. A media guidance application may determine that operations are being performed by an IoT device and may cause an interruption to media viewing. The media guidance application may prevent the interruption by extending or otherwise handling the operation.

20 Claims, 13 Drawing Sheets

(56) References Cited

U.S. PATENT DOCUMENTS

| | | | |
|---|---|---|---|
| 2017/0208434 A1* | 7/2017 | Shenhav | H04W 4/021 |
| 2017/0264956 A1* | 9/2017 | Gerhards | H04N 21/2187 |
| 2018/0167681 A1* | 6/2018 | Jeon | H04N 21/4334 |
| 2018/0197395 A1* | 7/2018 | Kuwana | G08B 21/182 |
| 2019/0119978 A1* | 4/2019 | Hall | H04L 12/2818 |

* cited by examiner

| Device | Operation | Contents | Start Time | End Time | Condition |
|---|---|---|---|---|---|
| Oven | Baking | Souffle | 17:25 | 18:25 | Alarm Requires Response |
| Refrigerator | Ice cycle | | | | Neutral |
| Washing Machine | Delicate wash | Delicate Items | 18:05 | 18:45 | Neutral |
| Dishwasher | n/a | | | | |
| Dryer | n/a | | | | |

| Device | Operation | Time Period | Condition | Intervention | Following Operation | Time Change |
|---|---|---|---|---|---|---|
| Oven | Baking | Check Timer | Alarm Requires Response | Requires Response. Response Based on Contents | Cool Down, Power Off | |
| Oven | Self-Cleaning | 120 | End of Cycle Alarm | Turns Off Following Cycle | | |
| Dishwasher | Regular Cycle | 45 | End of Cycle Alarm | Turns Off Following Cycle | Air dry | Delay/okay. Extendable |
| Dishwasher | Sanitation | 80 | End of Cycle Alarm | Turns Off Following Cycle | | Delay/okay. Extendable |
| Washing Machine | Regular Wash | 50 | End of Cycle Alarm | Requires Response Within 24 Hours of Cycle End | Gentle Spin, Repeat Wash Cycle | Delay/okay. Extendable |
| Dryer | Regular Dryer | 60 Standard, Sensor Based | End of Cycle Alarm | Turns Off Following Cycle | Air Dry Anti-wrinkle Cycle | Delay/okay. Extendable |
| Dryer | Dryer Anti-wrinkle | 60 | End of Cycle Alarm | Requires Response to Remove Items | Air Dry Anti-wrinkle Cycle | Delay/okay. Extendable |
| Refrigerator | Inventory | 20 Minutes | Noise | None | | Delay/okay. Extendable |

FIG. 4

| | | | | Delay Based on Expiration Type |
|---|---|---|---|---|
| Refrigerator | Expiration Reminder | Timer | Requires Response to Clear Reminder | 480 |
| Microwave | Heating | Check Timer | End of Period Alarm | Delay Start, Delay Intervention 485 |
| Robot Vacuum | Area Vacuum | 120 | End of Cycle Alarm, in Operation Underfoot and Noisy | Delay Okay But Only Operate MF 0900-1500 490 |
| Thermostat | Temperature Control | 68F 0600-2200, 55F 2201-0559 | Too Hot or Cold | Delay/okay. Extendable 495 |
| Lighting | Power Off Any on Lights | 2230-0600 | n/a | Extend Warmer Period 497 |
| Lighting | Security Based Random Lighting | User Settings | n/a | Extend Lights |
| | | | n/a | Delay/okay. Extendable 499 |

905 — Receive a Selection of a Media Asset for Playback from a User

910 — Responsive to the Selection of the Media Asset, Receive from a Network-connected Device in a Home of the User, Operation Status Information of an Operation Being Performed by the Network-connected Device

915 — Determine Based on the Operation Status Information Whether the Operation can be Extended to Terminate After Completion of Playback of the Media Asset without Triggering a Condition on the Network-connected Device

920 — In Response to Determining that the Operation can be Extended, Transmit a Command to the Network-connected Device to Extend the Operation Currently Performed by the Network-connected Device

925 — In Response to the Determining that the Operation Cannot be Extended, Pause Playback of the Media Asset and Present a Notification About the Operation Being Performed by the Network-connected Device

FIG. 9

SYSTEMS AND METHODS FOR PREEMPTIVELY PREVENTING INTERRUPTIONS FROM NETWORK-CONNECTED DEVICES FROM OCCURRING DURING MEDIA VIEWING

CROSS-REFERENCE TO RELATED APPLICATIONS

This application is a continuation of U.S. patent application Ser. No. 16/574,406, filed Sep. 18, 2019, which is a continuation of Ser. No. 15/936,827, filed Mar. 27, 2018, now U.S. Pat. No. 10,461,955, the disclosures of which are hereby incorporated by reference herein in their entireties.

BACKGROUND

Viewing media can be experienced in various environments. Many viewers enjoy watching media without distractions. In a household environment, there can be numerous distractions and interruptions to the viewer during media viewing. Some of these distractions may be important and necessary. However, other interruptions may not be urgent. For example, some household devices have alarms or buzzers than can make sounds and be disruptive to a media viewer. Some of these alarms may require intervention, while others may not. Other household devices, such as thermostats or lights, may have scheduled settings that cause them to turn on or off or change temperature which may be annoying to a viewer when watching media. Although there are many smart devices that may be network-connected and capable of remote accessibility and functionality, the alarms and disruptions may still interrupt a user when such alarms may not need immediate intervention. Handling interruptions by household devices by modifying settings or by notifying others of alarms may improve a viewer's media experience because the viewer may avoid disruptions in viewing media.

SUMMARY

The advancement of household devices and connectivity among such devices, as well as digital transmission of media content, has increased the amount of data that can be transmitted from various devices. In particular, household devices can communicate over a network and provide information to a controller about operations being performed by the household devices, as well as information about handling such operations and a condition of the household device and contents or objects associated with the device during and after the operation performance. For example, Internet of Things ("IoT") devices may be able to communicate over a network allowing a user to access device functionality from another location. In addition, media systems may transmit metadata that includes detailed information about media content. This metadata may include descriptions and tags to contents within the media asset as well as timing information. While this information, by itself, may not be useable for displaying to a human user, computer processors can read and interpret this information. However, while computer processors may read and interpret this information and generate media content for display that may be useable by a human user (e.g., output media content on a display screen in a human recognizable format), these systems still fail to solve the aforementioned problem when implemented in computer systems because an alarm or interruption event generated by a network-connected device in performance of an operation or following performance of the operation may still interrupt users when watching media when such alarm or interruption could be delayed or be avoided during the media viewing activity.

Accordingly, to overcome the problems created by unnecessary disruptions in media viewing, systems and methods are described for managing interruptions in devices, such as household devices that are part of an Internet of Things (IoT) arrangement, that may occur during media viewing. In particular, interruptions that may occur from operations performed by IoT devices may be detected by a media guidance application, and media activity timing may be obtained by the media guidance application using metadata for a media asset to determine, using control circuitry, whether interruptions will occur during viewing. The media guidance application control circuitry may retrieve information about interruptions and associated operations and IoT devices to determine a way to handle the interruption to avoid disturbing the viewer during media viewing. Handling the interruption may involve the media guidance application control circuitry sending a command to a network-connected IoT device to delay an operation, extend an operation, perform a secondary operation, or transmit a notification to another person about the interruption, or other response.

In an example, a viewer may select media to view using a media guidance application. The media guidance application may be connected to a home network and be capable of communicating (e.g., using control circuitry) a query for status information of devices in the household (e.g., network-connected or IoT devices). The media guidance application may be capable of communicating directly with any of the household devices using the home network, or may use an intermediary device such as a home assistant, e.g., Google Home, Apple Homepod, Amazon Echo, or another device for communications. The media guidance application may be able to retrieve, using control circuitry, information about the media selected by the viewer, such as time information for playback of the media or other media metadata that may be available from a media database. The status information received from the devices in the household may indicate whether any operations are being performed by the devices and whether any of those operations may occur during the playback period of the selected media. In some scenarios, the media guidance application using control circuitry may initiate a request for status information in response to selection of the media for viewing. The request for status information may include a query of network-connected devices in the household for an operation in progress and a start time for the respective operation in progress. Some examples of operations being performed by Internet of Things ("IoT") devices, such as a refrigerator, oven, washing machine, dishwasher, dryer, thermostat, robot vacuum or another device, may be operations such as cleaning, washing, heating, cooling, freezing, treating, and baking. Status information about such operations may indicate that household lights are due to go on or off for a random security pattern, an oven timer may be set for baking, a dryer may be performing an anti-wrinkle drying cycle, and/or a thermostat may be set to lower a heat setting at night. Any of these device operations may occur and terminate during the media playback period. When these operations end, they may require intervention by the viewer which may interrupt the viewer's media consumption experience. For example, when an oven timer sounds, the viewer may have to pause the media and turn off the oven or remove any items in the oven. Using the media guidance control circuitry to analyze these operations to determine whether they can be handled in a manner that avoids interrupting the media playback period may enhance the viewer's viewing experience by avoiding interruptions that may not be important or necessary and by sending notifications to other persons in a household to handle the interruption.

In an illustrative example, methods and systems for preventing media viewing interruptions may include receiving, at control circuitry for a media guidance application, a user's selection of a media asset for playback. The selection of the media asset may be input in the media guidance application using any suitable input device such as a remote control, keyboard, pointing device, touchscreen, voice command or another input. In response to the selection of the media asset, the media guidance application control circuitry may receive status information from household devices, such as IoT devices, which are network-connected devices in a home of the user, or another environment, such as an office or dormitory. The status information may be operation status information that indicates any operations being performed by the IoT devices in the household. Examples of household IoT devices may include an oven, thermostat, washing machine, dryer, dishwasher, refrigerator, robot vacuum, or other IoT device. Some examples of status information may be that a dishwasher or washing machine are performing a cleaning cycle, an oven is set to bake at 350° F. for 45 minutes, and a thermostat is set to 68° F. until 10:00 pm when it will lower to 55° F.

To determine whether such operations may occur during playback of the selected media, the media guidance application control circuitry may determine a time period for playback of the media asset. The time period for playback of the media asset may be obtained from metadata associated with the media asset. The media guidance application control circuitry may also determine a time period related to performance of the operation by the network-connected device including a start time for performance of the operation and an end time for performance of the operation. The media guidance application may compare, using control circuitry, the media asset playback time period and the operation time details to determine that the end time for performance of the operation precedes completion of the time period for the playback of the media asset. Thus, the media guidance application may determine that the operation will complete prior to the end of the playback period for the media asset potentially causing an interruption to the user during the playback period.

In order to analyze the operation or operations, the media guidance application may seek additional information about the operation being performed and send a query to a database of network-connected device operation procedures. The query may include a request for information associated with handling completion of the operation and also condition information of the network-connected device associated with the operation completion. The query may also include time information for the operation in progress.

For example, the query may seek an operation procedure from a database that may include details on potential outcomes for the network device upon completion of the operation. For example, a dishwasher may sound an alarm when a wash cycle is completed, but the condition of the dishwasher may be neutral in that the dishwasher and the contents of the dishwasher will not be harmed if the viewer does not turn off the dishwasher at the end of the cycle. In another example, an oven timer may sound at the end of a time period. If the oven is set to a baking temperature, the operation procedure may indicate that the contents of the oven may be overcooked or burn if the viewer does not open the oven or turn off the oven at the end of the timer period. The oven may include advanced settings that indicate the contents in the oven so that for roasted vegetables, the timing may be less critical than for a soufflé. In another example a dryer set to an anti-wrinkle dry setting may sound an alarm at the end of the cycle so that the user can remove the contents and avoid a garment wrinkling Operation procedures for an anti-wrinkle dry setting may indicate that the garment may become wrinkled if the user does not remove the item but that the dryer can extend the dry cycle to an air-dry cycle if the user cannot remove the item following completion of the cycle.

The media guidance application may use the operation procedures and operation status information to determine, using control circuitry, whether the operation can be extended to terminate, after completion of the time period for the playback of the media asset, without causing harm or causing an adverse or detrimental condition to the network-connected device or any objects associated with the network-connected device. Thus, the media guidance application may determine whether an operation can be extended so that the end of the operation does not interrupt the media playback period. Using the examples above, a dryer may be able to extend a drying cycle, or a dishwasher may add drying time at the end of the wash cycle. In such examples, in response to determining that the operation can be extended, the media guidance application may transmit a command, using control circuitry, to the network-connected device to extend the operation currently performed by the network-connected device. In some examples, however, the operation may not be able to be extended. For example, an oven set to bake at 350° F. for 30 minutes may not be extendable without the food in the oven burning or otherwise being in a detrimental condition. Thus, if the operation is extended, a viewer may avoid an interruption.

In response to determining that an operation cannot be extended, the media guidance application may pause playback of the media asset and present a notification about the operation being performed by the network-connected device. In this scenario, when the viewer selects a media item to view, the media guidance application may cause a notification to be displayed to the user that alerts the user to the upcoming interruption that will occur during the playback period of the media item so that the viewer is notified at the beginning of the viewing period, before they have started enjoying the media or become invested in the experience, and not disturbed during the media viewing activity when such interruption may be annoying.

Operations performed by IoT devices may have operation procedures that indicate various conditions and interventions for the operation. In addition, the operations may have different outcomes or conditions dependent on the objects associated with the operation. For example, baking different types of foods may have different response needs. A soufflé or cake may require immediate removal from an oven following a baking period, whereas roasted vegetables or roast meats may not need to be removed immediately. Such robust foods could also potentially be left in an oven that is turned off and left to cool following a baking operation. Information about contents or objects in an IoT device may be obtained by user entry or by using a camera associated with the IoT device or a home assistant device. For example, contents in an oven may be obtained by the network-connected device by user entry, e.g., that the user selects a timer, temperature, and notes a food type for the baking operation. Or a camera for a home assistant in a kitchen may capture a photograph of the oven at the time the baking operation is initiated. The photograph captured by the camera may be compared to a database of objects associated with the IoT device to find a matching object. The home assistant camera may take the photograph (or if the camera is associated with the IoT device, the IoT device will take the photograph) when an operation is initiated. In some scenarios, the photograph may be captured by the camera when a home assistant or the media guidance application is seeking status information for the network-connected device. In other scenarios, the photograph may be captured by the camera when the home assistant or media guidance application is notified that an interruption event will occur. In some scenarios, the content may be matched using an image database to identify the contents at the time the operation begins. In other scenarios, identification of the contents may be performed later if, and when, it is needed to determine whether the operation will need to be handled in a particular manner to avoid interrupting a household user.

In general, a command sent by the media guidance application to a network-connected device to extend an operation may be sent via the network or via a home assistant device. The command to extend the operation may be to increase a time period to perform the operation, add a secondary operation following the operation, power off the network-connected device, and pause the operation by the network-connected device. Some specific examples of these commands may be that a dishwasher cycle may be extended so that the end heating cycle may be increased by several more minutes, a dryer may add a following operation to add an air-dry cycle at the end of an anti-wrinkle cycle, the dishwasher may also be turned off, and a thermostat temperature cycle may be paused until after the playback period has ended.

These commands may be issued by the media guidance application upon analysis of the operation procedures which can determine what following operations may be available, or whether a device or its associated objects may be harmed by turning it off, or other details about the operations. For example, prior to sending a command to increase a time period for performance of the operation, the media guidance application may determine that increasing the time period to perform the operation does not cause the network-connected device or its associated objects detriment or adverse effects. Similarly, prior to sending a command to perform a secondary operation following the operation, the media guidance application may determine, using control circuitry, that the operation has an associated secondary operation that does not cause the network-connected device or its associated objects detriment or adverse effects. Such determination may be made by the media guidance application by analyzing, using control circuitry, operation procedures for the IoT devices. The operation procedures may include respective operation types and details for a respective time, interactivity, reaction, device condition, alarms, related or following operations, intervention, and post-operation handling for the operations.

In some scenarios, even if an operation cannot be extended, the operation may not need to interrupt the media playback period. For example, there may be a short threshold time period that may be acceptable to let an operation continue without an adverse effect. Such threshold time periods may be set by a user and be available to the media guidance application by analyzing, with control circuitry, a user profile. The threshold time periods may also be set in operation procedures that are associated with the operation. For example, 60 seconds may be a suitable threshold period for an oven time when a baking temperature is below 400° F. Alternatively, a dryer anti-wrinkle cycle may be able to sit without intervention for 3 minutes without wrinkling garments. The media guidance application may determine a remaining time period for completion of the operation using a current time, start or end time of the operation, a time period for the operation, or combination thereof, prior to the end of the playback period. The remaining time period may be compared to the threshold time period using control circuitry. If it is less than the threshold time period, the media guidance application may present a notification of the remaining time period for the user following the media viewing activity. This allows a user to finish media viewing without an interruption occurring when a short period of time remains between finishing the interruptive event and the media playback period.

In another scenario, the media guidance application may seek to slightly shorten the media viewing experience if the remaining time period is short and less than a certain threshold time period. For example, if the media playback period is 30 seconds later than the completion time for the operation, the media guidance application may determine an end time period being between the end time for performance of the operation and completion of the playback period of the media asset and compare the end time period with a second threshold time period. The end time period may be determined by the media guidance application control circuitry using metadata for the media asset and operation procedure time information. If the end time period is determined to be less than the second threshold time period, the media guidance application may analyze metadata for the selected media to identify a portion of the media asset that may be suitable for skipping. For example, an advertising segment or credits may be considered suitable for skipping. Such portion may have a duration that is more than the second threshold time period. If such skippable portion can be identified, the media guidance application may cause the media playback to skip the portion of the media asset suitable for skipping by sending a command to the media device to skip such portion. Thus, the media playback period may be slightly shortened so that the viewing experience is not interrupted by the household device operation.

In another illustrative example, methods and systems may be provided for preventing media viewing interruptions. A media guidance application may be used by a viewer to access a media item to view. While the media item is being played, the media guidance application may receive a notification from a network-connected device, such as an IoT device, in a home of a user that indicates that an interruption to the media consumption activity is imminent. The interruption event may be associated with the network-connected device. For example, a media guidance application may receive a notification from an IoT thermostat that the environment temperature may be lowered to a late-night cooler setting, from an oven that a timer for an oven bake setting is about to sound, from a dryer that a clothes drying cycle is about to end, or another notification. To avoid interrupting the media consumption activity, the media guidance application may seek information about the interruption event in order to find a way to handle or mitigate the effect of the interruption event.

In response to receiving the notification, the media guidance application may transmit a request, using control circuitry, to the network-connected device in the home of the user (or other environment) for status information associated with the network-connected device. The media guidance application may also send a query, using control circuitry, to a database of network-connected device operation procedures, that requests information associated with handling completion of an operation associated with the interruption event. The media guidance application may determine, based on the status information and the information associated with handling completion of the operation, whether the network-connected device includes a setting that enables delaying the interruption event. For example, a network-connected thermostat may be able to delay a temperature cycle, or a washing machine may be able to delay an end of cycle alarm. In response to determining that the network-connected device includes the delay setting, the media guidance application may transmit a command to the network-connected device to delay the interruption event. Thus, in the above examples, the media guidance application may send a command to a thermostat to delay a temperature change, or send a command to a washing machine to delay an end of cycle alarm. Delaying the operation may delay the alarm or interruption event so that a viewer is not disturbed during media viewing.

In some scenarios, however, a delay setting may not be available for an operation. In response to determining that the network-connected device does not include the delay setting, the media guidance application may transmit a notification that identifies the interruption event to a second user. For example, if an oven timer is set for baking and will end imminently, the media guidance application may send a notification of the timer to a second user in the household about the oven timer. Thus, instead of disturbing the viewer during media viewing, the media guidance application will send a notification about the interruption to another person to intervene.

The second user may be identified by the media guidance application by receiving, for example, from a home assistant device or the network-connected device performing the operation, a list of users associated with the network-connected device. The media guidance application control circuitry may select the second user from the list of users based on availability of the second user. The availability of the second user may be based on a proximity of a device associated with the second user and the network-connected device associated with the interruption event. For example, the media guidance application may alert the second user on a smartphone associated with the second user and use the location of the smartphone and its proximity to the respective network-connected device as a basis for selecting the second user. More particularly, in a household having multiple persons, a person nearest the device involved in the operation causing the interruption event may be selected for the notification if such person is available.

In general, the network-connected devices may be any household device that is connected to a network, such as an IoT device, and which may be performing an operation such as cleaning, washing, heating, cooling, freezing, treating, and baking, that may lead to the interruption event. Operation procedures for these operations may include respective operation types and comprises details for a respective time for the operation, interactivity, reaction, alarm, related operations, intervention, device object effects, post-operation handling, and a threshold time for intervention following completion.

Some operations performed by network-connected devices may be able to end without detriment to the device or objects associated with the device. For example, a washing machine clean cycle may end and the washer as well as the clothes may be fine for a period of time without intervention by a user. In another example, a dishwasher regular clean cycle may be able to end without damaging the dishes if a user does not immediately end it. In contrast, a dishwasher cycle for washing glassware may require removing the glassware so that the items do not become spotted. Such a condition may not be critically detrimental, but may still be considered one to avoid. If an operation or interruption event cannot be delayed, it may be possible to avoid interruptions caused by events that can be left without causing detriment to the device or objects associated with the device. In response to determining that the network-connected device does not include the delay setting, the media guidance application control circuitry may determine, based on the information associated with handling completion of an operation associated with the interruption event, an event type for the interruption event. The event type may be determined to be one that does not cause detriment to the network-connected device and an object associated with the network-connected device. In such scenarios, the media guidance application may suppress the interruption event and generate a notification about the interruption event following consumption of the media, i.e., after the media has been played so that the viewing experience is not interrupted by a less than critical interruption event.

Another way to handle the interruption event when the event cannot be delayed because the network-connected device does not include a delay setting, may be to turn off the network-connected device. In response to determining that the network-connected device does not include the delay setting, the media guidance application may determine, using control circuitry based on information about handling the completion of the operation associated with the interruption event as well as a condition of the network-connected device upon completing the operation, that the network-connected device can be powered off before the interruption event. For example, a washing machine or dishwasher may be turned off following a regular washing cycle without damaging the machines or respective contents. In contrast, an oven could be turned off following a baking cycle, but the food being baked may be overcooked if left in an oven that may retain heat for a period of time. In these scenarios, the media guidance application may send a query, using control circuitry, to the database of network-connected device operation procedures requesting information associated with objects associated with the network-connected device in performance of the operation associated with the interruption event. The media guidance application may use such information to determine whether the objects associated with the device will be harmed by turning off the device. If the media guidance application determines that the objects are not harmed by turning off the device, the media guidance application may transmit, before the interruption event, a command to the network-connected device to power off. Thus, a washing machine or dishwasher may be turned off before a finish cycle alarm sounds to avoid disturbing a viewer viewing media.

In some scenarios, if the interruption event cannot be delayed because the network-connected device does not include a delay setting, the media guidance application may generate an intervening display to present to the user so that the user does not miss the main portion of the media. The display may include a notification about the interruption event as well as a secondary segment, such as some background graphics, advertising, interesting content, or other suitable media. The secondary segment may be displayed for a calculated time period based on a time needed for handling or responding to the interruption event and a time needed to travel the distance between the user and the network-connected device. Providing the secondary segment may minimize a disruption to media viewing because content is provided that may not be a main focus of the viewer. The secondary segment may also include a countdown clock so that the user has a sense of how long they have to intervene in the interruption event before resuming the media consumption activity.

In another scenario, if the network-connected device does not include a delay setting, the media guidance application may seek other responses or interventions to avoid the interruption event. The media guidance application may query a database of operation procedures to determine whether a second operation is available to follow the interruption event, the second operation is one that is performed by the network-connected device without action by the user. Examples of second or following operations may be adding a second drying cycle to a dishwasher that may be set to a glassware cycle or adding an air-dry cycle to an anti-wrinkle drying cycle in a clothes dryer. The media guidance application may check that the time to perform the second operation will end after completion of the media consumption activity, for example, so that it does not simply delay the interruption. If the timing is suitable, then the media guidance application may transmit a command to the network-connected device to perform the second operation at the interruption event. Thus, the media guidance application may send a command to the dryer to add an air-dry cycle for a time period exceeding the time remaining in the media consumption activity so that the viewer's viewing experience is not disturbed by an alarm or interruption following the operation.

Another way to avoid an interruption event may be to determine whether the gap in time between the interruption event and the end of the media consumption activity exceeds a threshold time period. If the time gap is relatively short and the interruption event is of a suitable type, then the media guidance application may suppress the interruption event. For example, in response to determining that the network-connected device does not include a delay setting, the media guidance application may determine a time period remaining for the media consumption activity, a time for the interruption event, and an event type for the interruption event. The timing information may be obtained by the media guidance application control circuitry from metadata for a media asset and from operation information. The media guidance application may compare, using control circuitry, the time period with a threshold time period associated with the event type. For example, some types of less than critical events may have a longer threshold time period where the events can be suppressed, and some critical events that can cause detriment to a machine or its contents may have a short threshold time period. In response to determining that the time period is less than the threshold time period associated with the event type, the media guidance application may suppress the interruption event until the end of the media consumption activity. For example, the media guidance application may send a command to an associated IoT device to not sound an alarm following the end of an operation until the end of media viewing. Thus, the disruption may be suppressed until the end of the media viewing playback period.

In another example, the media guidance application may handle an interruption event by displaying a secondary segment at the time of the interruption event. The media guidance application may analyze metadata associated with the media to identify a portion of the media that may be secondary content, such as advertising, credits, or other content. In response to determining that the network-connected device does not include a delay setting, the media guidance application may determine a time period remaining for the media consumption activity and identify, using control circuitry based on metadata for the media, a secondary segment that is a secondary focus of the media consumption activity and display the secondary segment at the time of the interruption event. Thus, an advertising segment may be displayed at a time corresponding to the interruption event. Having an interruption occur when an advertising or secondary segment is displayed may be less disruptive to a viewer than having a disruption occur during content that is a main focus of the viewer.

It should be noted that the systems, methods, apparatuses, and/or aspects described above may be applied to, or used in accordance with, other systems, methods, apparatuses, and/ or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 4 shows an illustrative example of operation procedures and details in accordance with some embodiments of the disclosure;

FIG. 9 is a flowchart of an illustrative process for handling an operation being performed by a network-connected device when selecting a media asset in accordance with some embodiments of the disclosure;

DETAILED DESCRIPTION

Accordingly, systems and methods are described herein for enhancing a viewer's media consumption experience by preventing or handling events that may interrupt viewing the media. In particular, when a viewer selects media for viewing, a media guidance application may request status information from household devices to determine whether any of the devices are performing operations that may interrupt viewing the media and then minimize disruptions by handling the interruptions.

The household devices may be any network-connected devices in a home or an environment near a media viewing location, such as an office, dormitory, school, or other location. The network-connected devices may be Internet of Things ("IoT") devices which are capable of communicating between the devices and a controller such as a home assistant, for example, Google Home, Apple Homepod, Amazon Echo and other home assistants. Some types of operations performed by IoT devices may be able to be performed without interrupting the viewer. For example, a washing machine may perform a clothes washing cycle and finish the cycle with an alarm sounding but having a neutral condition that does not necessarily require immediate intervention. Other types of operations require intervention to avoid detriment or adverse effects to the device or objects associated with the device. For example, a baking operation in an oven using a timer may require intervention at the end of the timer period to avoid overcooking or burning the oven contents. Other types of operations may need intervention but can be left for a limited period of time without overly adverse effects. For example, an anti-wrinkle drying cycle in a dryer may end and be followed by an air-dry cycle to keep garments from wrinkling, or end and sit for a short period of time before a user may remove the garments. These operations may be managed by a media guidance application, or a media guidance application in conjunction with a home assistant device, to limit interruptions in a media viewing experience. Such techniques may be applied preemptively when media is selected for viewing so that a user is notified of upcoming interruptions prior to starting media consumption, or such interruptions may be managed by the media guidance application. In addition, these techniques may be applied in real time if an interruption is imminent during media viewing, and the media guidance application coordinates handling of the interruption to minimize breaks and disruption in the user's media viewing experience.

Figure 1:
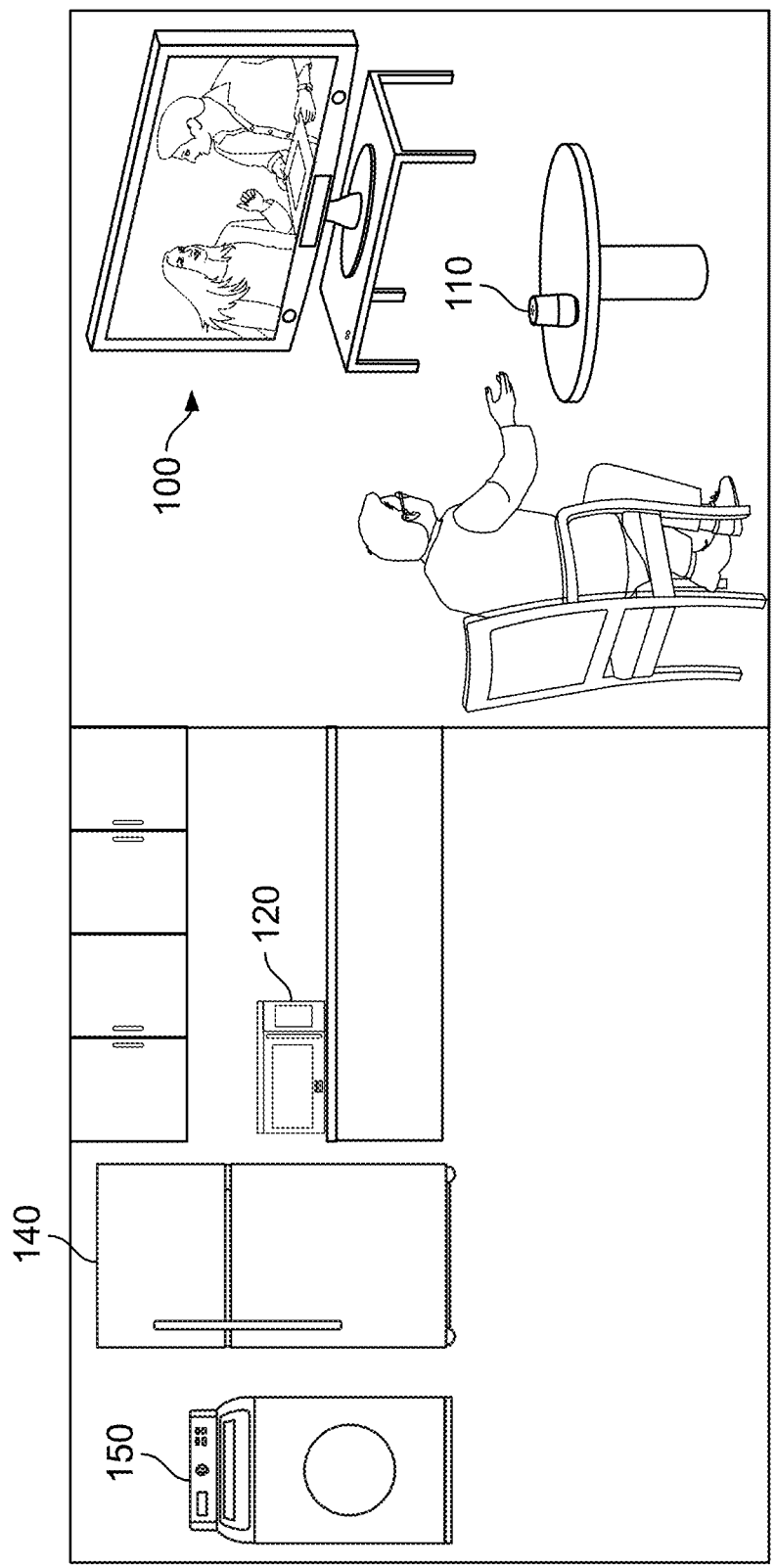
FIG. 1 shows an illustrative example of an environment in which a media consumption activity may occur and a household that may have network-connected devices in accordance with some embodiments of the disclosure.

FIG. 1 depicts an illustrative household environment in which a user may consume media displayed on a screen 100, which may be a television, computer monitor or other display device. In the household, there may be a home assistant 110, such as a Google Home, Amazon Echo, Apple Homepod or another assistant. The home assistant 110 and the screen 100 may be communicatively coupled over a home network with a media guidance application which may be used to provide media interfaces for accessing media to view on the screen 100. The household environment may also have various network-connected devices or IoT devices that are also connected via the home network and capable of being controlled using IoT applications and using the home assistant 100. Some examples of home network-connected devices include an oven 120, refrigerator 140 and washer/dryer 150. Other network-connected and IoT devices, not depicted, may include robot vacuums, thermostats, security cameras, lighting systems, dishwashers, or other devices.

In an illustrative example, a user may use the media guidance application to select media to view on the screen 100. When the media selection is received, the media guidance application may request status information from the network-connected devices. Any of the network-connected devices may send status information to the home assistant 100 or the media guidance application of operations in progress so that the media guidance application can detect whether any of such operations in progress may cause an interruption to media viewing. In some scenarios, since operations may begin after a media selection is made, the media guidance application may periodically request status updates from network-connected devices for operation information to detect, on an ongoing basis, whether interruption events may occur. In yet other scenarios, the media guidance application may receive updates from network-connected devices when an interruption is about to occur. In any of these scenarios, the media guidance application may seek information about the operations and the interruption events to determine a suitable handling technique. For example, some operations may be delayed, paused, ended, extended, and in some scenarios, additional operations may be added to avoid interrupting media viewing. In other scenarios, an intervention may be needed and so another household member may be identified and sent a notification of the interruption event.

Figures 2, 3:
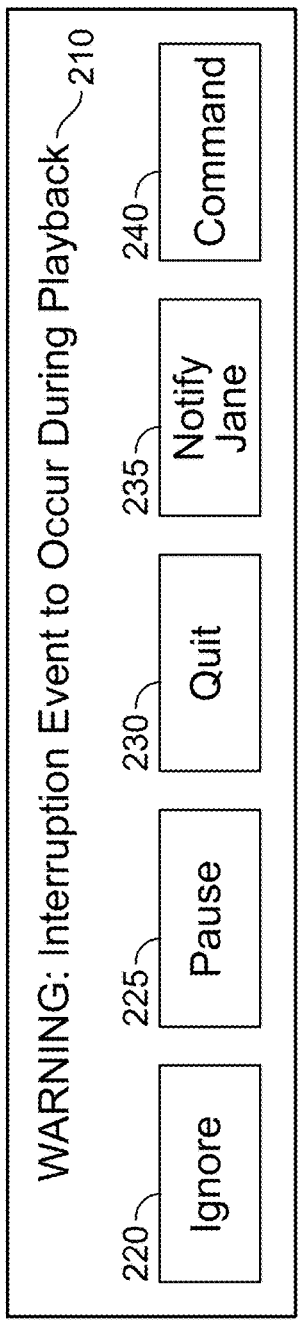
FIG. 2 shows an illustrative example of a notification generated by a media guidance application in accordance with some embodiments of the disclosure.
FIG. 3 shows an illustrative example of a status information for network-connected devices in accordance with some embodiments of the disclosure.

Generally speaking, notifications about interruption events are sought to be minimized or avoided entirely so that a media viewing experience is not disrupted. However, in some scenarios, an interruption event cannot be completely avoided and so a notification may be displayed for a viewer. Turning to FIG. 2, a display screen 200, which may be a television, computer monitor or other display screen, may show a notification that is generated by a media guidance application. An example of notification 210 may include a message that says that an interruption event will occur during playback of media. Such notification 210 may be presented following selection of media for viewing and before the media is displayed. The notification 210 may be generated when a media is selected, which may cause the media guidance application to query network-connected devices for status information of operations so that the media guidance application can preemptively determine whether any operations are in progress that may cause an interruption. The message 210 may include additional information about the interruption event, for example, the operation causing the interruption, timing and the associated network-connected device. The display screen 200 may also include options for handling the interruption event, including, for example, an ignore option 220, pause option 225, quit option 230, alternate notification 235 and a command 240. Selection of the ignore option 220 may cause the notification message 210 to close and be ignored. The pause option 225 may be selected to pause playback of the media. The quit option 230 may be used to quit the media viewing. The alternate notification 235 option may be selected to send the notification message 210 to another user. The command option 240 may be selected to send a suitable command to a network-connected device associated with the interruption event. For example, if the interruption event is an oven timer sounding, there may be a command to turn off the oven. In another example, if the interruption event is to turn on area lights based on a security setting, there may be a command to not turn on the area lights. Other notification message information may also be depicted in screen 200, for example a timer or countdown clock for the interruption event, background graphics or advertising segment so that the viewer does not miss any of the media content, location information for the network-connected device, intervention handling recommendations, or other suitable information.

In order for the media guidance application to prevent and avoid unnecessary interruptions, the media guidance application first needs to know what operations are in progress. The media guidance application may send a request for status information from the network-connected devices in a household, such as any IoT devices. The status information may be provided in a data record such as the data record depicted in FIG. 3.

FIG. 3 depicts a data record of status information 300 that includes devices 305, operations 310, contents 312, a start time 315, end time 318, and a condition 320. The status information 300 may also include other related operation details. The status information 300 may be used by the media guidance application to determine whether any operations are being performed and whether they will finish during a time period overlapping with a media viewing activity. For example, one active operation 325 may be that an oven is baking from 17:25-18:25 and has an end condition of an alarm that requires a response. For some types of operations, a response may depend on the contents or objects associated with the operation. For example, if a soufflé is being baked 325, it may require intervention to remove it from the oven at the end of the timer period. In contrast, a pot roast or roasted potatoes, may be able to sit in an oven for a few minutes following a timer period. Another active operation 330 may be a refrigerator ice making cycle which may have an unspecified time and end in a neutral condition, i.e., meaning that the operation does not require intervention. Another active operation 335 may be that a washing machine is performing a delicate wash cycle of delicate items from 18:05 to 18:45 and also has a neutral condition. Other devices may report that they are not performing active operations, e.g., 340 and 345. Based on the status information 300, a media guidance application may determine that there is one operation 325 that requires intervention. If the operation time, i.e., from 17:25-18:25, overlaps with the media viewing time, then the media guidance application may seek a way to handle the interruption to minimize or avoid disruption to the viewer. To make such a determination, the media guidance application may request additional information about operation procedures.

Status information may include contents 312 information because some operations may be handled differently depending on the contents or objects used in an operation. For example, baking different types of foods may have different response needs. A soufflé or cake may require immediate removal from an oven following a baking period, whereas roasted vegetables or roast meats may not need to be removed immediately. Such robust foods could also potentially be left in an oven that is turned off and left to cool following a baking operation. Information about contents of the oven may be obtained by the network-connected device by user entry, e.g., that the user selects a timer, temperature and notes a food type for the baking operation. Content information may also be obtained using a photograph that may be captured by a camera associated with the IoT device at the time the operation begins. The photograph captured by the camera may be compared to a database of objects associated with the IoT device to find a matching object.

An example list of operation procedures is depicted in FIG. 4. The operation procedures record 400 may include information about devices 405, operations 410, time periods 415, a condition 420, an intervention 425, a following operation 430, a time change 435, or other details about an operation. The devices 405 may include any network-connected device such as a household IoT device. Examples of devices 405 may include an oven (440), dishwasher (450), a washing machine (460), dryer (470), and other devices. The operations 410 may include operations that may be performed by the respective devices 405. For example, a baking operation may be performed by an oven 440. The time period 415 may be a period of time required to perform the respective operation 410. For example, a time period for baking 440 may depend on an oven timer. Other time periods may be fixed, for example, a regular dishwashing cycle may be 45 minutes 450. Conditions 420 may be a condition caused during or following performance of the respective operation 410. For example, a condition following oven baking may be that an alarm requires response 440. Interventions 425 may include ways to intervene following performance of the respective operation 410. Using the baking example, an illustrative intervention may be that a response is required 440. Other operations may not necessarily require a response, such as a dishwashing regular cycle may turn off following the cycle 450. A following operation 430 may be an operation or operations that can follow a respective operation 410. An example of a following operation to a regular dishwasher cycle may be an air-dry cycle 450. A time change 435 may be an indication of whether the operation, if scheduled or in operation, can be delayed. For example, a weekday schedule for area vacuuming using a robot vacuum may be okay to delay per 490, or a thermostat that is set to change temperature based on a schedule 495 can be changed. The details in FIG. 4 can be updated by the network-connected devices based on information added by a user, or by a manufacturer's updates, or from a suitable source such as crowd based updates. The information in FIG. 4 may be stored in a database that is accessible to a controller, such as a home assistant (FIG. 1, 110) or a media guidance application.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 5:
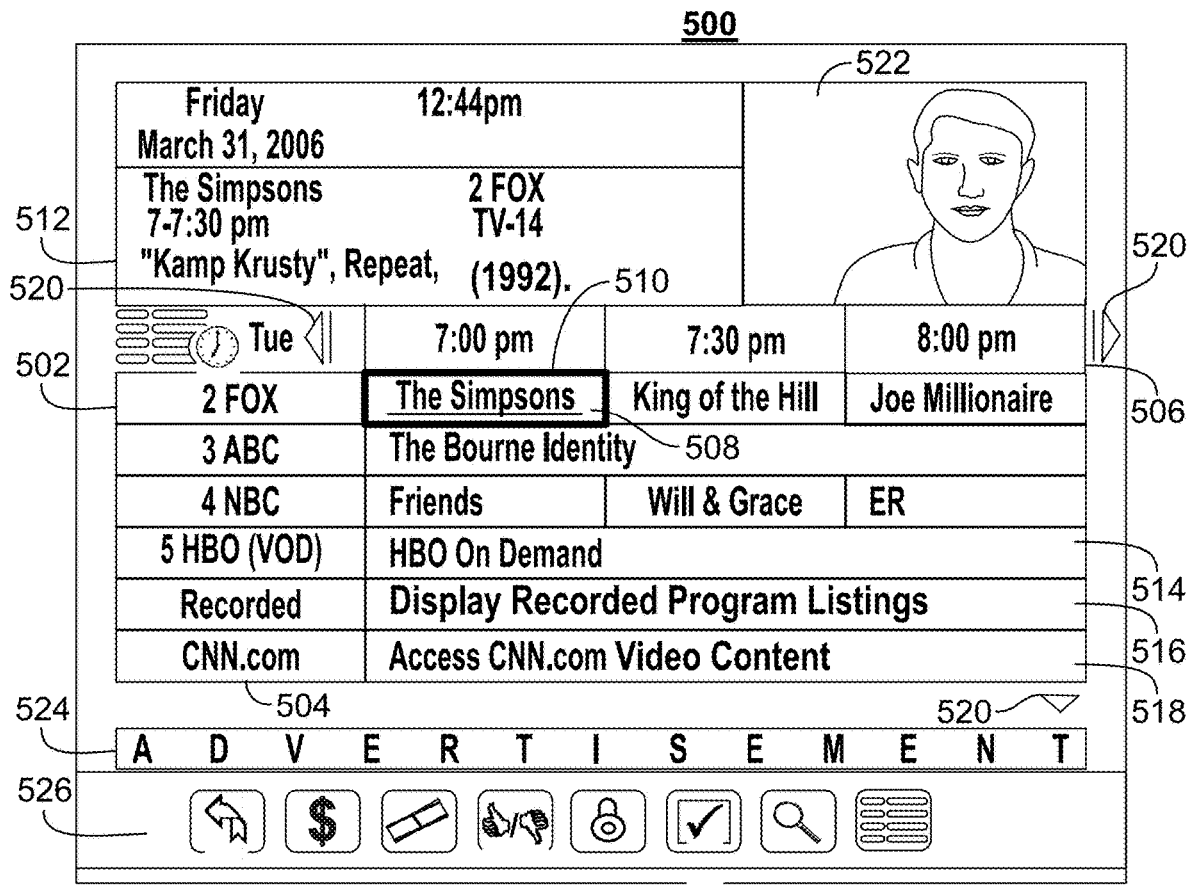
FIGS. 5-6 show other illustrative examples of display screens generated by a media guidance application in accordance with some embodiments of the disclosure.
Figure 6:
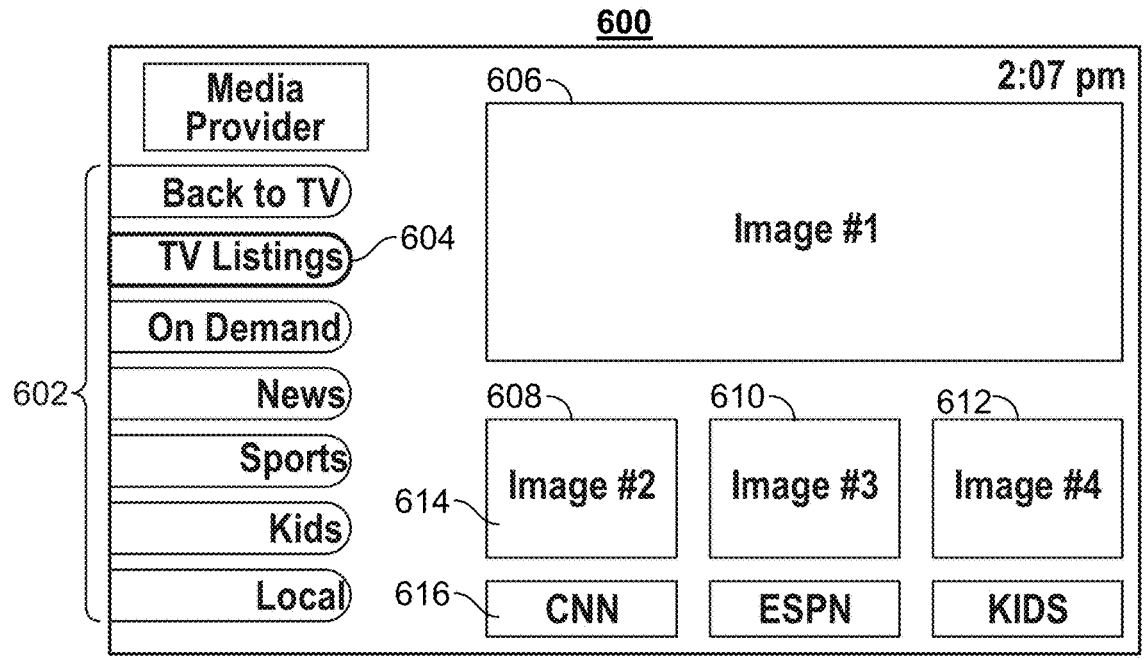

FIGS. 5-6 show illustrative display screens that may be used to provide media guidance data. The display screens shown in FIGS. 5-6 may be implemented on any suitable user equipment device or platform. While the displays of FIGS. 5-6 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 5 shows illustrative grid of a program listings display 500 arranged by time and channel that also enables access to different types of content in a single display. Display 500 may include grid 502 with: (1) a column of channel/content type identifiers 504, where each channel/content type identifier (which is a cell in the column) identifies a different channel or content type available; and (2) a row of time identifiers 506, where each time identifier (which is a cell in the row) identifies a time block of programming. Grid 502 also includes cells of program listings, such as program listing 508, where each listing provides the title of the program provided on the listing's associated channel and time. With a user input device, a user can select program listings by moving highlight region 510. Information relating to the program listing selected by highlight region 510 may be provided in program information region 512. Region 512 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 502 may provide media guidance data for non-linear programming including on-demand listing 514, recorded content listing 516, and Internet content listing 518. A display combining media guidance data for content from different types of content sources is sometimes referred to as a "mixed-media" display. Various permutations of the types of media guidance data that may be displayed that are different than display 500 may be based on user selection or guidance application definition (e.g., a display of only recorded and broadcast listings, only on-demand and broadcast listings, etc.). As illustrated, listings 514, 516, and 518 are shown as spanning the entire time block displayed in grid 502 to indicate that selection of these listings may provide access to a display dedicated to on-demand listings, recorded listings, or Internet listings, respectively. In some embodiments, listings for these content types may be included directly in grid 502. Additional media guidance data may be displayed in response to the user selecting one of the navigational icons 520. (Pressing an arrow key on a user input device may affect the display in a similar manner as selecting navigational icons 520.)

Display 500 may also include video region 522, and options region 526. Video region 522 may allow the user to view and/or preview programs that are currently available, will be available, or were available to the user. The content of video region 522 may correspond to, or be independent from, one of the listings displayed in grid 502. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 526 may allow the user to access different types of content, media guidance application displays, and/or media guidance application features. Options region 526 may be part of display 500 (and other display screens described herein), or may be invoked by a user by selecting an on-screen option or pressing a dedicated or assignable button on a user input device. The selectable options within options region 526 may concern features related to program listings in grid 502 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 8. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 6. Video mosaic display 600 includes selectable options 602 for content information organized based on content type, genre, and/or other organization criteria. In display 600, television listings option 604 is selected, thus providing listings 606, 608, 610, and 612 as broadcast program listings. In display 600 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 608 may include more than one portion, including media portion 614 and text portion 616. Media portion 614 and/or text portion 616 may be selectable to view content in full-screen or to view information related to the content displayed in media portion 614 (e.g., to view listings for the channel that the video is displayed on).

The listings in display 600 are of different sizes (i.e., listing 606 is larger than listings 608, 610, and 612), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 7:
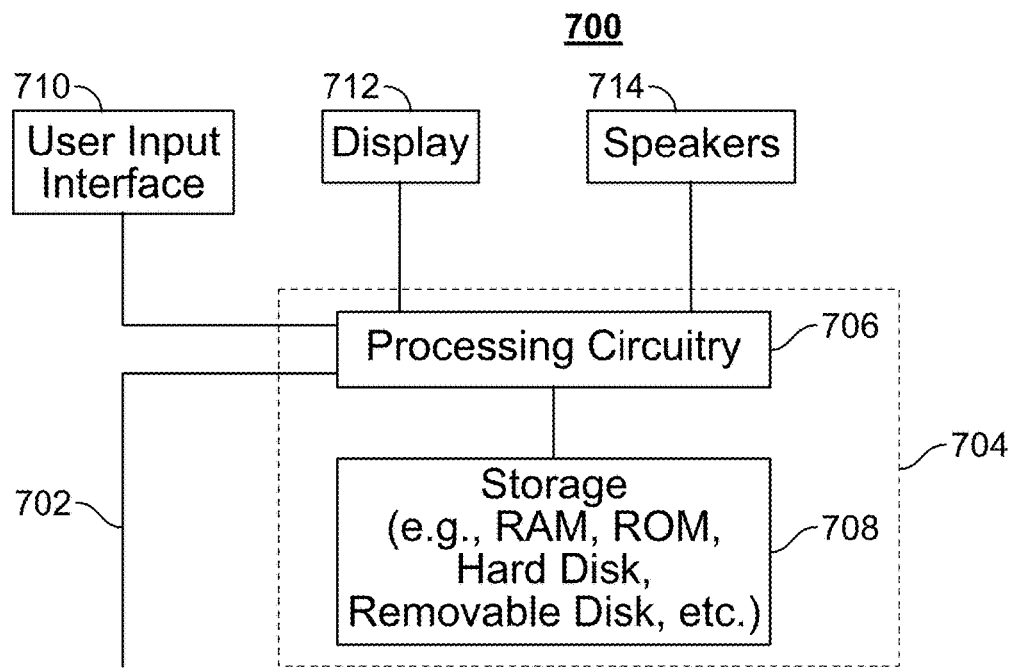
FIG. 7 is a block diagram of an illustrative user equipment device in accordance with some embodiments of the disclosure.

Users may access content and the media guidance application (and its display screens described above and below) from one or more of their user equipment devices. FIG. 7 shows a generalized embodiment of illustrative user equipment device 700. More specific implementations of user equipment devices are discussed below in connection with FIG. 8. User equipment device 700 may receive content and data via input/output (hereinafter "I/O") path 702. I/O path 702 may provide content (e.g., broadcast programming, on-demand programming, Internet content, content available over a local area network (LAN) or wide area network (WAN), and/or other content) and data to control circuitry 704, which includes processing circuitry 706 and storage 708. Control circuitry 704 may be used to send and receive commands, requests, and other suitable data using I/O path 702. I/O path 702 may connect control circuitry 704 (and specifically processing circuitry 706) to one or more communications paths (described below). I/O functions may be provided by one or more of these communications paths, but are shown as a single path in FIG. 7 to avoid overcomplicating the drawing.

Control circuitry 704 may be based on any suitable processing circuitry such as processing circuitry 706. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 704 executes instructions for a media guidance application stored in memory (i.e., storage 708). Specifically, control circuitry 704 may be instructed by the media guidance application to perform the functions discussed above and below. For example, the media guidance application may provide instructions to control circuitry 704 to generate the media guidance displays. In some implementations, any action performed by control circuitry 704 may be based on instructions received from the media guidance application.

In client-server based embodiments, control circuitry 704 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 8). In addition, communications circuitry may include circuitry that enables peer-to-peer communication of user equipment devices, or communication of user equipment devices in locations remote from each other (described in more detail below).

Memory may be an electronic storage device provided as storage 708 that is part of control circuitry 704. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 708 may be used to store various types of content described herein as well as media guidance data described above. Nonvolatile memory may also be used (e.g., to launch a boot-up routine and other instructions). Cloud-based storage, described in relation to FIG. 8, may be used to supplement storage 708 or instead of storage 708.

Control circuitry 704 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 704 may also include scaler circuitry for upconverting and downconverting content into the preferred output format of the user equipment 700. Circuitry 704 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 708 is provided as a separate device from user equipment 700, the tuning and encoding circuitry (including multiple tuners) may be associated with storage 708.

A user may send instructions to control circuitry 704 using user input interface 710. User input interface 710 may be any suitable user interface, such as a remote control, mouse, trackball, keypad, keyboard, touch screen, touchpad, stylus input, joystick, voice recognition interface, or other user input interfaces. Display 712 may be provided as a stand-alone device or integrated with other elements of user equipment device 700. For example, display 712 may be a touchscreen or touch-sensitive display. In such circumstances, user input interface 710 may be integrated with or combined with display 712. Display 712 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images.

In some embodiments, display 712 may be HDTV-capable. In some embodiments, display 712 may be a 3D display, and the interactive media guidance application and any suitable content may be displayed in 3D. A video card or graphics card may generate the output to the display 712. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 704. The video card may be integrated with the control circuitry 704. Speakers 714 may be provided as integrated with other elements of user equipment device 700 or may be stand-alone units. The audio component of videos and other content displayed on display 712 may be played through speakers 714. In some embodiments, the audio may be distributed to a receiver (not shown), which processes and outputs the audio via speakers 714.

The guidance application may be implemented using any suitable architecture. For example, it may be a stand-alone application wholly-implemented on user equipment device 700. In such an approach, instructions of the application are stored locally (e.g., in storage 708), and data for use by the application is downloaded on a periodic basis (e.g., from an out-of-band feed, from an Internet resource, or using another suitable approach). Control circuitry 704 may retrieve instructions of the application from storage 708 and process the instructions to generate any of the displays discussed herein. Based on the processed instructions, control circuitry 704 may determine what action to perform when input is received from input interface 710. For example, movement of a cursor on a display up/down may be indicated by the processed instructions when input interface 710 indicates that an up/down button was selected.

In some embodiments, the media guidance application is a client-server based application. Data for use by a thick or thin client implemented on user equipment device 700 is retrieved on-demand by issuing requests to a server remote to the user equipment device 700. In one example of a client-server based guidance application, control circuitry 704 runs a web browser that interprets web pages provided by a remote server. For example, the remote server may store the instructions for the application in a storage device. The remote server may process the stored instructions using circuitry (e.g., control circuitry 704) and generate the displays discussed above and below. The client device may receive the displays generated by the remote server and may display the content of the displays locally on equipment device 700. This way, the processing of the instructions is performed remotely by the server while the resulting displays are provided locally on equipment device 700. Equipment device 700 may receive inputs from the user via input interface 710 and transmit those inputs to the remote server for processing and generating the corresponding displays. For example, equipment device 700 may transmit a communication to the remote server indicating that an up/down button was selected via input interface 710. The remote server may process instructions in accordance with that input and generate a display of the application corresponding to the input (e.g., a display that moves a cursor up/down). The generated display is then transmitted to equipment device 700 for presentation to the user.

In some embodiments, the media guidance application is downloaded and interpreted or otherwise run by an interpreter or virtual machine (run by control circuitry 704). In some embodiments, the guidance application may be encoded in the ETV Binary Interchange Format (EBIF), received by control circuitry 704 as part of a suitable feed, and interpreted by a user agent running on control circuitry 704. For example, the guidance application may be an EBIF application. In some embodiments, the guidance application may be defined by a series of JAVA-based files that are received and run by a local virtual machine or other suitable middleware executed by control circuitry 704. In some of such embodiments (e.g., those employing MPEG-2 or other digital media encoding schemes), the guidance application may be, for example, encoded and transmitted in an MPEG-2 object carousel with the MPEG audio and video packets of a program.

Figure 8:
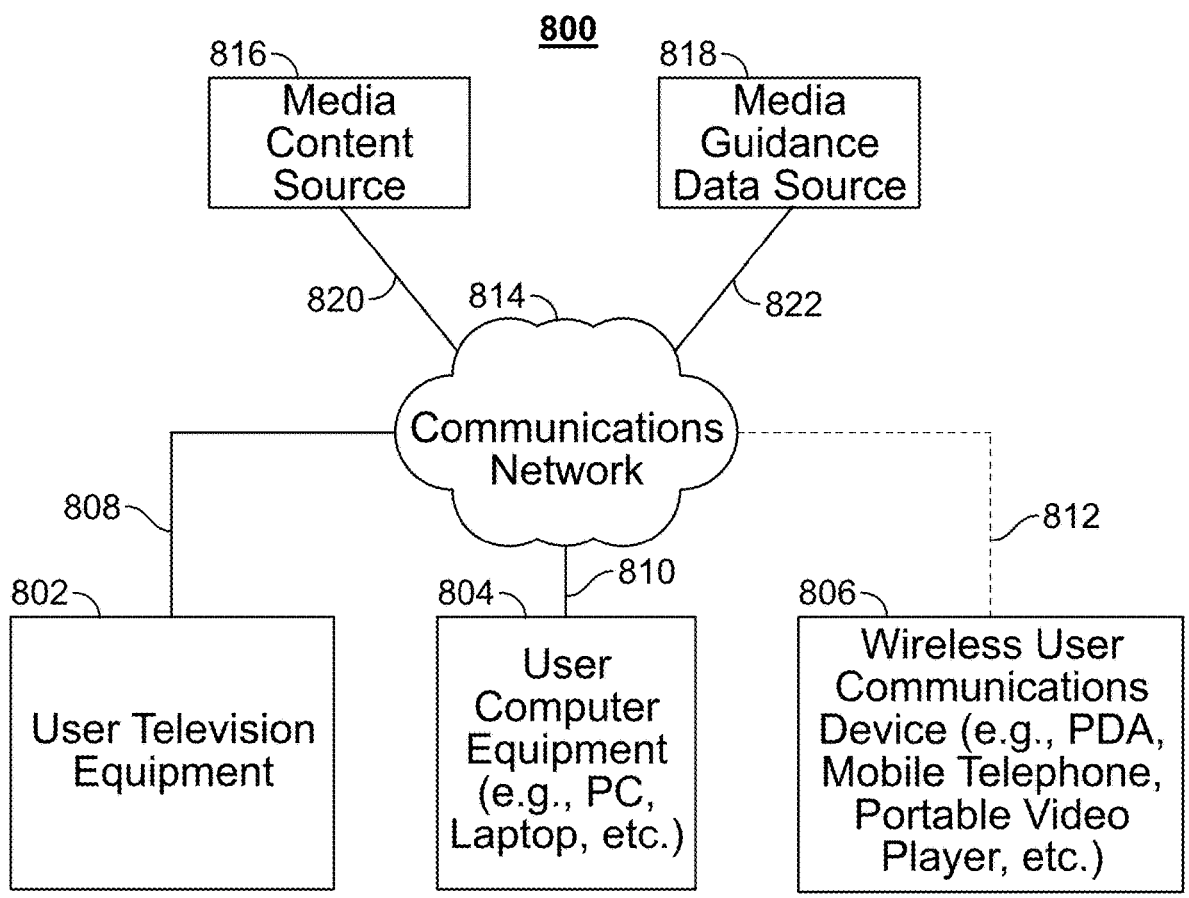
FIG. 8 is a block diagram of an illustrative media system in accordance with some embodiments of the disclosure.

User equipment device 700 of FIG. 7 can be implemented in system 800 of FIG. 8 as user television equipment 802, user computer equipment 804, wireless user communications device 806, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 802, user computer equipment 804, or a wireless user communications device 806. For example, user television equipment 802 may, like some user computer equipment 804, be Internet-enabled allowing for access to Internet content, while user computer equipment 804 may, like some television equipment 802, include a tuner allowing for access to television programming. The media guidance application may have the same layout on various different types of user equipment or may be tailored to the display capabilities of the user equipment. For example, on user computer equipment 804, the guidance application may be provided as a web site accessed by a web browser. In another example, the guidance application may be scaled down for wireless user communications devices 806.

In system 800, there is typically more than one of each type of user equipment device but only one of each is shown in FIG. 8 to avoid overcomplicating the drawing. In addition, each user may utilize more than one type of user equipment device and also more than one of each type of user equipment device.

In some embodiments, a user equipment device (e.g., user television equipment 802, user computer equipment 804, wireless user communications device 806) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 814. Namely, user television equipment 802, user computer equipment 804, and wireless user communications device 806 are coupled to communications network 814 via communications paths 808, 810, and 812, respectively. Communications network 814 may be one or more networks including the Internet, a mobile phone network, mobile voice or data network (e.g., a 4G or LTE network), cable network, public switched telephone network, or other types of communications network or combinations of communications networks. Paths 808, 810, and 812 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 812 is drawn with dotted lines to indicate that in the exemplary embodiment shown in FIG. 8 it is a wireless path and paths 808 and 810 are drawn as solid lines to indicate they are wired paths (although these paths may be wireless paths, if desired). Communications with the user equipment devices may be provided by one or more of these communications paths, but are shown as a single path in FIG. 8 to avoid overcomplicating the drawing.

Although communications paths are not drawn between user equipment devices, these devices may communicate directly with each other via communication paths, such as those described above in connection with paths 808, 810, and 812, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 814.

System 800 includes content source 816 and media guidance data source 818 coupled to communications network 814 via communication paths 820 and 822, respectively. Paths 820 and 822 may include any of the communication paths described above in connection with paths 808, 810, and 812. Communications with the content source 816 and media guidance data source 818 may be exchanged over one or more communications paths, but are shown as a single path in FIG. 8 to avoid overcomplicating the drawing. In addition, there may be more than one of each of content source 816 and media guidance data source 818, but only one of each is shown in FIG. 8 to avoid overcomplicating the drawing. (The different types of each of these sources are discussed below.) If desired, content source 816 and media guidance data source 818 may be integrated as one source device. Although communications between sources 816 and 818 with user equipment devices 802, 804, and 806 are shown as through communications network 814, in some embodiments, sources 816 and 818 may communicate directly with user equipment devices 802, 804, and 806 via communication paths (not shown) such as those described above in connection with paths 808, 810, and 812.

Content source 816 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 816 may be the originator of content (e.g., a television broadcaster, a Webcast provider, etc.) or may not be the originator of content (e.g., an on-demand content provider, an Internet provider of content of broadcast programs for downloading, etc.). Content source 816 may include cable sources, satellite providers, on-demand providers, Internet providers, over-the-top content providers, or other providers of content. Content source 816 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 818 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 818 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 818 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 818 may provide user equipment devices 802, 804, and 806 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 708, and executed by control circuitry 704 of a user equipment device 700. In some embodiments, media guidance applications may be client-server applications where only a client application resides on the user equipment device, and server application resides on a remote server. For example, media guidance applications may be implemented partially as a client application on control circuitry 704 of user equipment device 700 and partially on a remote server as a server application (e.g., media guidance data source 818) running on control circuitry of the remote server. When executed by control circuitry of the remote server (such as media guidance data source 818), the media guidance application may instruct the control circuitry to generate the guidance application displays and transmit the generated displays to the user equipment devices. The server application may instruct the control circuitry of the media guidance data source 818 to transmit data for storage on the user equipment. The client application may instruct control circuitry of the receiving user equipment to generate the guidance application displays.

Content and/or media guidance data delivered to user equipment devices 802, 804, and 806 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 800 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 8.

In one approach, user equipment devices may communicate with each other within a home network. User equipment devices can communicate with each other directly via short-range point-to-point communication schemes described above, via indirect paths through a hub or other similar device provided on a home network, or via communications network 814. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 816 to access content. Specifically, within a home, users of user television equipment 802 and user computer equipment 804 may access the media guidance application to navigate among and locate desirable content. Users may also access the media guidance application outside of the home using wireless user communications devices 806 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 814. These cloud resources may include one or more content sources 816 and one or more media guidance data sources 818. In addition or in the alternative, the remote computing sites may include other user equipment devices, such as user television equipment 802, user computer equipment 804, and wireless user communications device 806. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 804 or wireless user communications device 806 having content capture feature. Alternatively, the user can first transfer the content to a user equipment device, such as user computer equipment 804. The user equipment device storing the content uploads the content to the cloud using a data transmission service on communications network 814. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 7.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 9 is a flowchart of illustrative steps of a process 900 for handling an operation being performed by a network-connected device when selecting a media asset in accordance with some embodiments of the disclosure. It should be noted that process 900 or any step thereof could be performed on, or provided by, any of the devices shown in FIGS. 7-8. For example, process 900 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 900 may be incorporated into or combined with one or more steps of any other process or embodiment described herein.

FIG. 9 depicts a flowchart for a process 900 for avoiding interruptions during playback of a media asset. FIG. 9 may be implemented in an environment such as that shown in FIG. 1 where a media viewer may view media on a screen 100 (FIG. 1) and control circuitry 704 for a media guidance application may handle, in conjunction a home assistant 110 (FIG. 1) with network-connected devices in a household to manage any operations being performed in the home. The environment around a media viewing area could be a household or other environment such as a dormitory, office, or other location that may have media displays as well as a local network with network-connected devices. Process 900 may begin at step 905 with selection of a media asset for playback. Step 905 may be initiated by the viewer by selecting a media asset from, for example, a program guide (e.g., the guides 500 and 600, FIGS. 5 and 6) or another media interface. The media selection may be input using an input device such as a remote control, smartphone, touchscreen, voice command or other suitable input. The selection of the media asset will be received at the control circuitry 704 for the media guidance application.

In response to the selection of the media asset, at step 910 the control circuitry 704 for the media guidance application may receive, from a network-connected device in a home of the user, operation status information of an operation being performed by the network-connected device. In some scenarios, the control circuitry 704 for the media guidance application may initiate a request for the status information, and in other scenarios, the status information may be sent periodically to devices on the network or upon a change in status of one of the devices on the network or other basis. The status information may be the information shown in the record 300 (FIG. 3) which includes operation status for network-connected devices. In general, process 900 involves operation status for operations that are currently being performed so that an interruption can be avoided or known before a media viewing activity begins. As an example, if an oven is set to bake and has a timer setting of 45 minutes, the oven can communicate the baking operation to the control circuitry 704 for the media guidance application as its status information. Process 900 can also be used for scheduled operations that may be scheduled to occur during a media viewing activity. For example, a thermostat may communicate, to the control circuitry 704 for the media guidance application, that it is scheduled to lower an ambient temperature at 10:00 pm.

At step 915, the control circuitry 704 for the media guidance application may determine, based on the operation status information, whether the operation can be extended to terminate after completion of playback of the media asset without triggering a condition on the network-connected device. The status information, e.g., status information 300 (FIG. 3) may include condition information about the operations. For example, the baking operation 325 may require a response as its condition of the device. In contrast, a condition of a washing machine performing a gentle wash cycle may have a neutral condition 335 that does not require a response. Whether an operation is extendable may be determined using operation procedure information which can be supplied as part of the status information or retrieved separately. The operation procedure information may include time change information and following operation details, such as time change 435 and following operations 430 (FIG. 4), which can indicate, for example, that a thermostat can have its heating schedule extended or changed 499.

At step 920 in response to the control circuitry 704 for the media guidance application determining that the operation can be extended, the control circuitry 704 for the media guidance application may transmit a command to the network-connected device to extend the operation currently performed by the network-connected device. For example, since a thermostat heating schedule can be changed or extended, the control circuitry 704 for the media guidance application can send a command to the thermostat via the home assistant 110 or via the home network to extend the schedule. In this scenario, a viewer can watch the selected media without the media room becoming cooler after 10:00 pm.

Some operations, however, cannot be extended. At step 925 in response to the control circuitry 704 for the media guidance application determining that an operation cannot be extended, the control circuitry 704 for the media guidance application may pause playback of the media asset and present a notification about the operation being performed by the network-connected device. For example, if a baking operation is being performed by an oven, rather than have the oven timer interrupt the media viewing activity, the control circuitry 704 for the media guidance application may pause playback of the selected media and present a notification, such as that shown in FIG. 2, that the oven timer will go off. The notification can provide additional information about the interruption, such as the baking operation, identify the device as the oven, as well as time information for the interruption. Other helpful information and options for handling the interruption may also be supplied in the notification.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 9.

Figure 10:
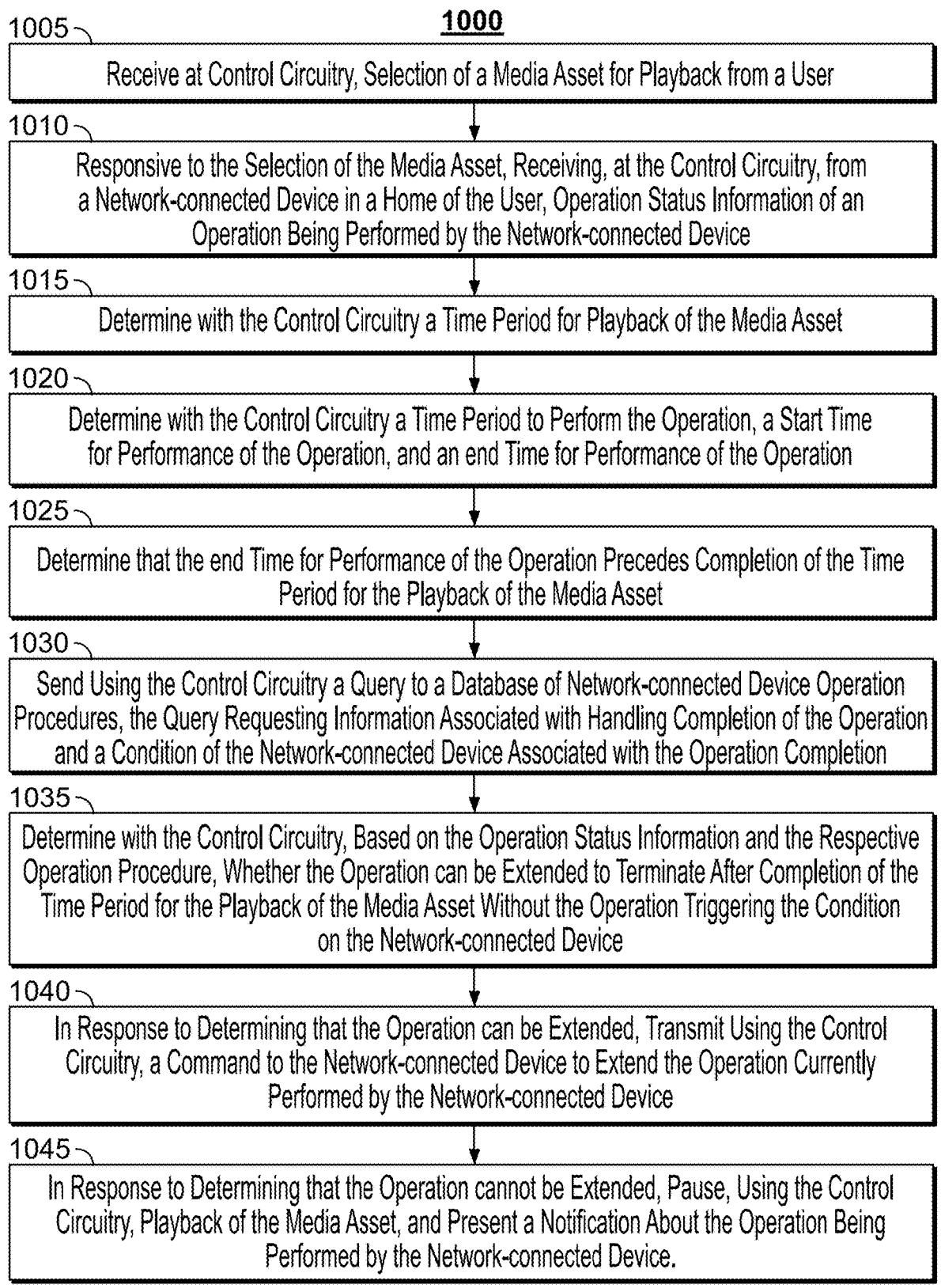
FIG. 10 is a flowchart of another illustrative process for handling an operation being performed by a network-connected device when selecting a media asset in accordance with some embodiments of the disclosure.

FIG. 10 is a flowchart of illustrative steps of a process 1000 for handling an operation being performed by a network-connected device when selecting a media asset in accordance with some embodiments of the disclosure. It should be noted that process 1000 or any step thereof could be performed on, or provided by, any of the devices shown in FIGS. 7-8. For example, process 1000 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1000 may be incorporated into or combined with one or more steps of any other process or embodiment described herein.

FIG. 10 depicts a flowchart for a process 1000 for handling an interruption to a media viewing activity. FIG. 10 may be implemented in an environment such as that shown in FIG. 1 where a media viewer may view media on a screen 100 (FIG. 1), and control circuitry 704 for a media guidance application may handle, in conjunction a home assistant 110 (FIG. 1) with network-connected devices in a household to manage any operations being performed in the home. The environment around a media viewing area could be a household or other environment such as a dormitory, office, or another location that may have media displays as well as a local network with network-connected devices. Process 1000 may begin at step 1005 with control circuitry 704 for a media guidance application receiving a selection of a media asset for playback. The selection of the media asset may be made by the viewer by selecting a media asset from, for example, a program guide (e.g., the guides 500 and 600, FIGS. 5 and 6) or another media interface. The media selection may be input using an input device such as a remote control, smartphone, touchscreen, voice command or other suitable input. The selection of the media asset may be received at the control circuitry 704 for the media guidance application.

In response to the selection of the media asset, at step 1010 the control circuitry 704 for the media guidance application may receive, from a network-connected device in a home of the user, operation status information of an operation being performed by the network-connected device. In some scenarios, the control circuitry 704 for the media guidance application may initiate a request for the status information, and in other scenarios, the status information may be sent periodically to devices on the network or upon a change in status of one of the devices on the network or other basis. The status information may be the information shown in the record 300 (FIG. 3) which includes operation status for network-connected devices. In general, process 1000 involves operation status for operations that are currently being performed so that an interruption can be avoided or known before a media viewing activity begins. As an example, if an oven is set to bake and has a timer setting of 45 minutes, the oven can communicate the baking operation to the control circuitry 704 for the media guidance application as its status information. Process 1000 can also be used for scheduled operations that may be scheduled to occur during a media viewing activity. For example, a thermostat may communicate to the control circuitry 704 for the media guidance application that it is scheduled to lower an ambient temperature at 10:00 pm.

At step 1015 the control circuitry 704 for the media guidance application may determine a time period for playback of the media asset. The time period for playback of the media asset may be information that is available for retrieval by the control circuitry 704 for the media guidance application from metadata associated with the media asset or by request from a media database.

In addition to needing playback time to identify potential interruptions in the media playback, the media guidance application needs to know the timing of the operations being performed in the household. At step 1020, the control circuitry 704 for the media guidance application may determine a time period to perform an operation, including, for example, a start time for performance of the operation, an end time for performance of the operation, and/or a time period for performing the operation. Such information may be obtained using operation information and operation procedures, such as those shown in FIGS. 3 and 4.

At step 1025, the control circuitry 704 for the media guidance application may compare the timing information obtained at steps 1015 and 1020 and determine that the end time for performance of the operation precedes completion of the time period for the playback of the media asset. Thus, the operation will finish before the end of playback of the media asset, causing an interruption in the media playback if the operation requires handling.

If an operation is determined to finish before the media asset ends, at step 1030, the control circuitry 704 for the media guidance application may send a query to a database of network-connected device operation procedures, the query requesting information associated with handling completion of the operation and a condition of the network-connected device associated with the operation completion. The operation procedures may include additional information about a particular operation in progress or may include information about any operations capable of being performed by network-connected devices. Examples of operation procedures are depicted in FIG. 4. Step 1030 may also be combined with step 1010 so that operational details are received along with status information so that multiple queries are not needed.

At step 1035, the control circuitry 704 for the media guidance application may determine, based on the operation status information and respective operation procedure, whether the operation can be extended to terminate after completion of playback of the media asset without triggering a condition on the network-connected device. The status information, e.g., status information 300 (FIG. 3) may include condition information about the operations. For example, the baking operation 325 may require a response as its condition of the device. In contrast, a condition of a washing machine performing a gentle wash cycle may have a neutral condition 335 that does not require a response. Whether an operation is extendable may be determined using operation procedure information which can be supplied as part of the status information or retrieved separately. The operation procedure information may include time change information and following operation details, such as time change 435 and following operations 430 (FIG. 4), which can indicate, for example, that a thermostat can have its heating schedule extended or changed 499.

At step 1040 in response to the control circuitry 704 for the media guidance application determining that the operation can be extended, the control circuitry 704 for the media guidance application may transmit a command to the network-connected device to extend the operation currently performed by the network-connected device. For example, since a thermostat heating schedule can be changed or extended, the control circuitry 704 for the media guidance application can send a command to the thermostat via the home assistant 110 or via the home network to extend the schedule. In this scenario, a viewer can watch the selected media without the media room becoming cooler after 10:00 pm. In another example, a washing machine may have an extendable or following operation 460 that can follow a wash cycle and so a command may be issued to the washing machine using the control circuitry 704 for the media guidance application to add an additional cycle or extend the spin cycle.

Some operations, however, cannot be extended. At step 1045 in response to the control circuitry 704 for the media guidance application determining that an operation cannot be extended, the control circuitry 704 for the media guidance application may pause playback of the media asset and present a notification about the operation being performed by the network-connected device. For example, if a baking operation is being performed by an oven, rather than have the oven timer interrupt the media viewing activity, the control circuitry 704 for the media guidance application may pause playback of the selected media and present a notification, such as that shown in FIG. 2, that the oven timer will go off. The notification can provide additional information about the interruption, such as the baking operation, identify the device as the oven, as well as time information for the interruption. Other helpful information and options for handling the interruption may also be supplied in the notification.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 10.

Figure 11:
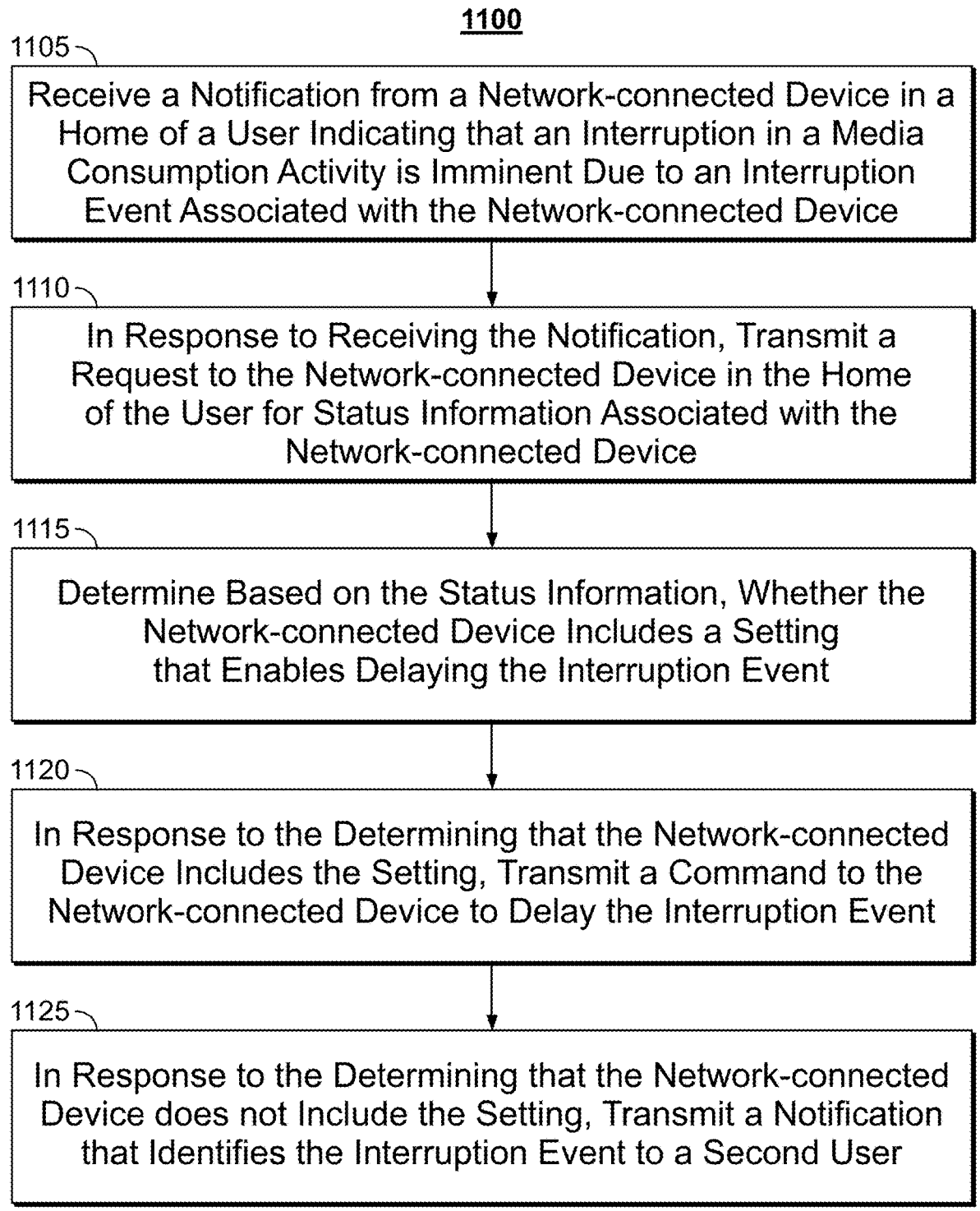
FIG. 11 is a flowchart of an illustrative process for handling an imminent interruption event during a media consumption activity in accordance with some embodiments of the disclosure.

FIG. 11 is a flowchart of illustrative steps of a process 1100 for handling an imminent interruption event by a network-connected device during a media consumption activity in accordance with some embodiments of the disclosure. It should be noted that process 1100 or any step thereof could be performed on, or provided by, any of the devices shown in FIGS. 7-8. For example, process 1100 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1100 may be incorporated into or combined with one or more steps of any other process or embodiment described herein.

FIG. 11 depicts a process 1100 for handling an interruption to a media consumption activity. Process 1100 may be followed to avoid or handle interruptions that are imminent when a viewer is already viewing media. This may be helpful when at the time media viewing begins, there are no known operations that may cause an interruption.

At step 1105, control circuitry 704 for a media guidance application may receive a notification from a network-connected device in a home of a user indicating that an interruption in a media consumption activity is imminent due to an interruption event associated with the network-connected device. For example, in an environment such as that depicted in FIG. 1, a user may view a media asset on screen 100 and a device in the home, such as an oven 120 may be performing a baking operation and have a timer set to go off imminently. The network-connected device may communicate the imminent interruption, i.e., that the over timer is about to go off, to the control circuitry 704 for the media guidance application over the network.

At step 1110 in response to receiving the notification, the control circuitry 704 for the media guidance application may transmit a request to the network-connected device in the home of the user for status information associated with the network-connected device. For example, the control circuitry 704 for the media guidance application may request information about the operation that may be causing the imminent interruption event. Examples of information requested may be timing, as well as handling procedures, such as whether the operation will cause a detrimental condition or whether the operation can be delayed so that the operation does not interrupt the media viewing experience.

At step 1115 the control circuitry 704 for the media guidance application may determine, based on the status information, whether the network-connected device includes a setting that enables delaying the interruption event. The status information and operation procedures for the operation may be similar to those shown in FIGS. 3 and 4 which include details on network-connected device operations. For example, an oven baking operation cannot be delayed 440 (FIG. 4), but a refrigerator inventory operation, which may be noisy, could be delayed 475 (FIG. 4).

At step 1120, in response to the determining that the network-connected device includes the setting, i.e., a delay setting, the control circuitry 704 for the media guidance application may transmit a command to the network-connected device to delay the interruption event. Thus, for operations that can be delayed, the control circuitry 704 for the media guidance application may send a command to the associated device to delay the operation or the part of the operation that will cause the interruption event.

Some operations cannot be delayed, such as a baking operation in an oven. For such operations, at step 1125, in response to determining that the network-connected device does not include the delay setting, the control circuitry 704 for the media guidance application may transmit a notification that identifies the interruption event to a second user. In such scenarios, the control circuitry 704 for the media guidance application may identify another person in the household that may be able to handle the interruption event. For example, the control circuitry 704 for the media guidance application may send a notification to take an item out of the oven and turn it off. The notification may include helpful information about the operation such as the location of the device, time remaining until the interruption event, or other useful details.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 11.

Figure 12:
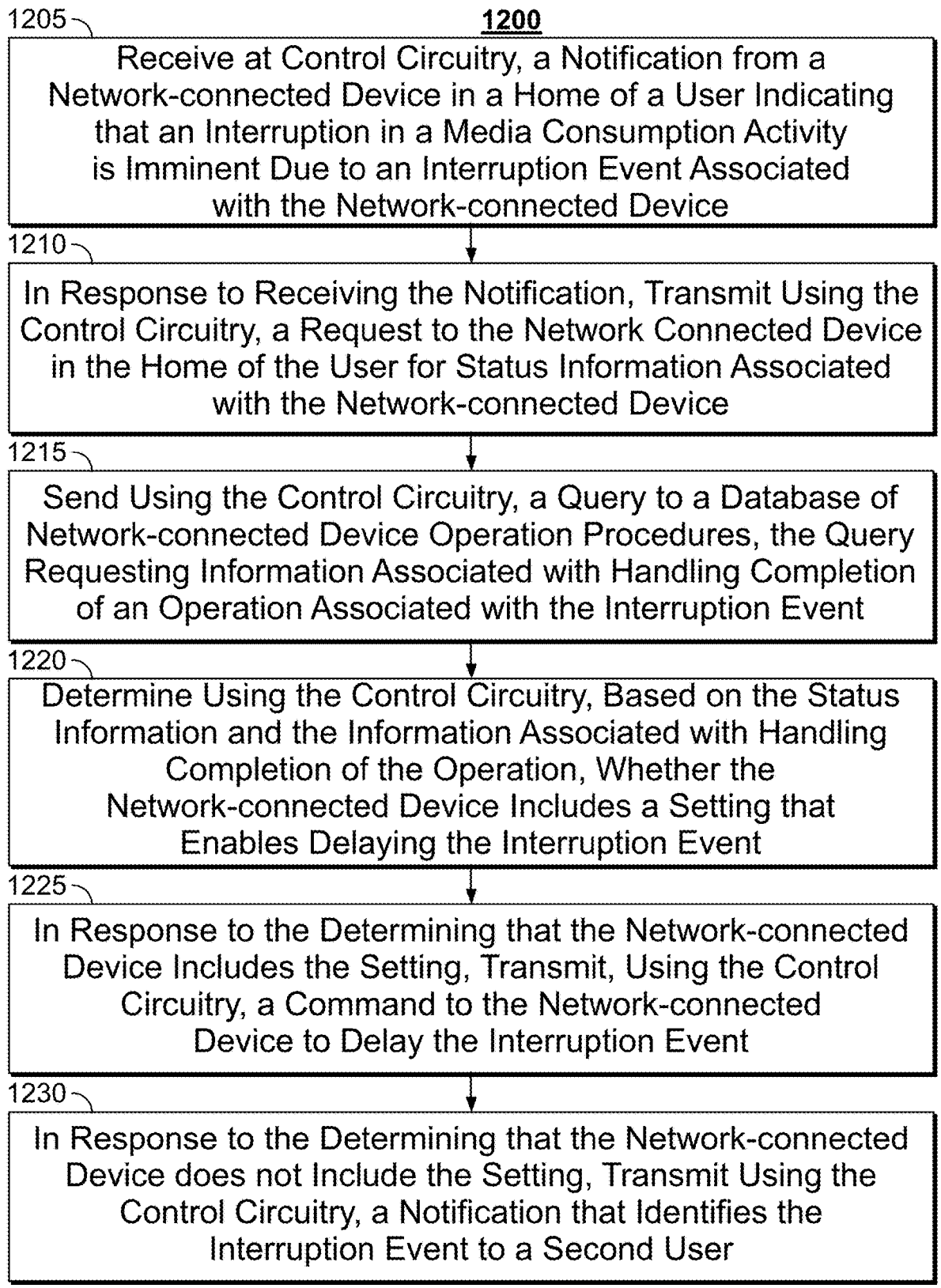
FIG. 12 is a flowchart of another illustrative process for handling an imminent interruption event during a media consumption activity in accordance with some embodiments of the disclosure.

FIG. 12 is a flowchart of illustrative steps of a process 1200 for handling an imminent interruption event by a network-connected device during a media consumption activity in accordance with some embodiments of the disclosure. It should be noted that process 1200 or any step thereof could be performed on, or provided by, any of the devices shown in FIGS. 7-8. For example, process 1200 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1200 may be incorporated into or combined with one or more steps of any other process or embodiment described herein.

FIG. 12 depicts a process 1200 for handling an interruption to a media consumption activity. Process 1200 may be followed to avoid or handle interruptions that are imminent when a viewer is already viewing media. This may be helpful when, at the time media viewing begins, there are no known operations that may cause an interruption.

At step 1205, control circuitry 704 for a media guidance application may receive a notification from a network-connected device in a home of a user indicating that an interruption in a media consumption activity is imminent due to an interruption event associated with the network-connected device. For example, in an environment such as that depicted in FIG. 1, a user may view a media asset on screen 100 and a device in the home, such as an oven 120, may be performing a baking operation and have a timer set to go off imminently. The network-connected device may communicate the imminent interruption, i.e., that the over timer is about to go off, to the control circuitry 704 for the media guidance application over the network.

At step 1210 in response to receiving the notification, the control circuitry 704 for the media guidance application may transmit a request to the network-connected device in the home of the user for status information associated with the network-connected device. For example, the control circuitry 704 for the media guidance application may request status information about the operation that may be causing the imminent interruption event, including, for example, timing, identification of the device and operation, or other details.

At step 1215 in response to receiving the notification, the control circuitry 704 for the media guidance application may send a query to a database of network-connected device operation procedures, the query requesting information associated with handling completion of an operation associated with the interruption event. For example, the control circuitry 704 for the media guidance application may send a request for operation procedures such as those shown in FIGS. 3 and 4 which may include details on handling an operation. Some examples of information requested by the control circuitry 704 for the media guidance application may be timing, as well as handling procedures, such as whether the operation will cause a detrimental condition or whether the operation can be delayed so that the operation does not interrupt the media viewing experience.

At step 1220, the control circuitry 704 for the media guidance application may determine, based on the status information and the information associated with handling completion of the operation, whether the network-connected device includes a setting that enables delaying the interruption event. For example, for a baking operation, the control circuitry 704 for the media guidance application may consider details 440 to determine whether the operation can be delayed. In another example, the control circuitry 704 for the media guidance application may consider details 475 to determine whether a noisy refrigerator inventory process can be delayed. In another example, the control circuitry 704 for the media guidance application may consider details 495 to determine whether a thermostat setting can be changed.

At step 1225, in response to determining that the network-connected device includes the setting, i.e., a delay setting, the control circuitry 704 for the media guidance application may transmit a command to the network-connected device to delay the interruption event. Thus, for operations that can be delayed, the control circuitry 704 for the media guidance application may send a command to the associated device to delay the operation or the part of the operation that will cause the interruption event. For example, the control circuitry 704 for the media guidance application may send a command to a thermostat to delay a temperature change.

Some operations cannot be delayed, such as a baking operation in an oven (440 (FIG. 4)). For such operations, at step 1230, in response to determining that the network-connected device does not include the delay setting, the control circuitry 704 for the media guidance application may transmit a notification that identifies the interruption event to a second user. In such scenarios, the control circuitry 704 for the media guidance application may identify another person in the household that may be able to handle the interruption event. For example, the control circuitry 704 for the media guidance application may send a notification to take an item out of the oven and turn it off. The notification may include helpful information about the operation such as the location of the device, time remaining until the interruption event, or other useful details.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 12.

Figure 13:
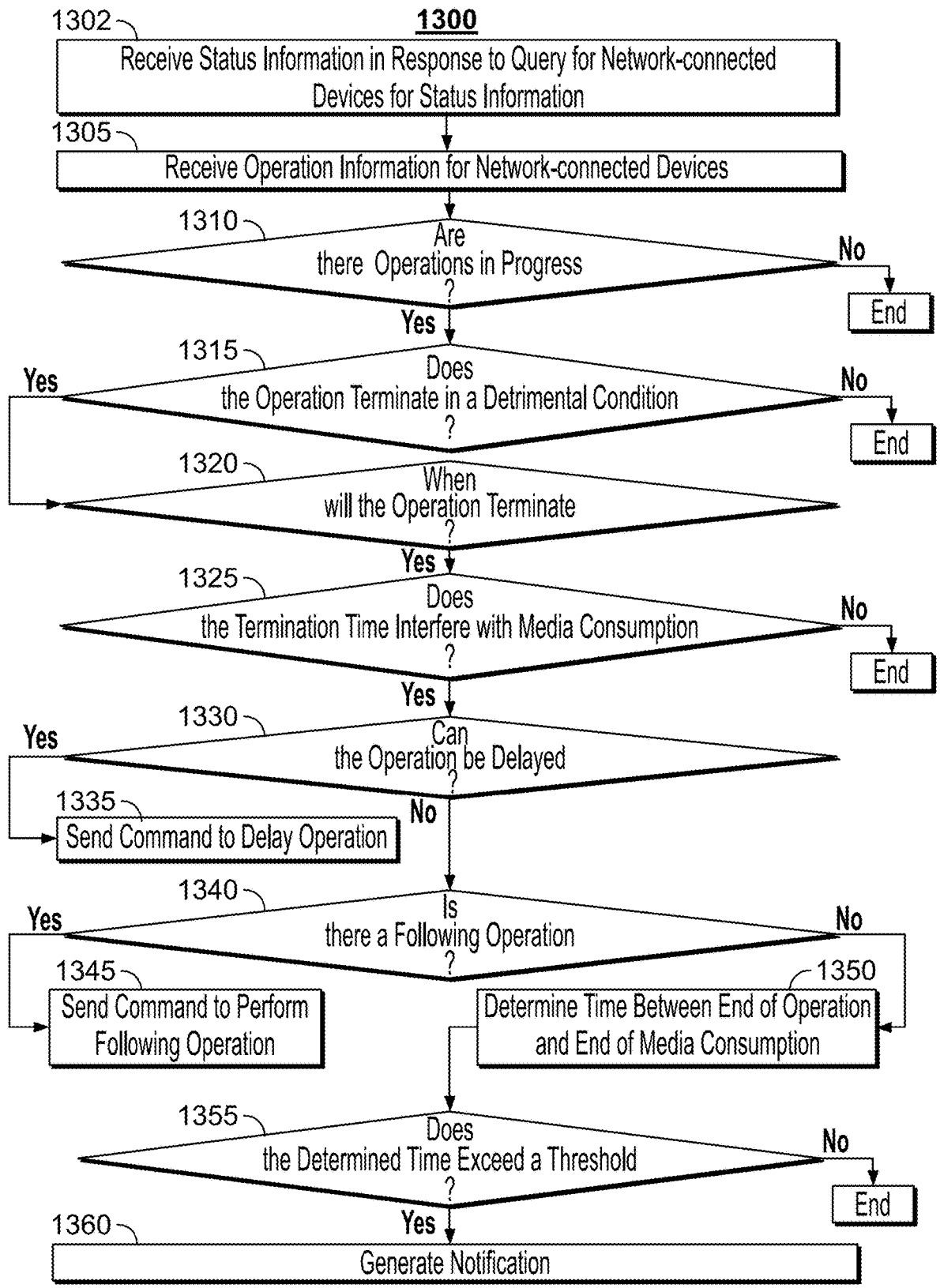
FIGS. 13-14 are flowcharts of illustrative processes for handling an interruption event during a media consumption activity in accordance with some embodiments of the disclosure.

FIG. 13 is a flowchart of illustrative steps of a process 1300 for handling an interruption event by a network-connected device in accordance with some embodiments of the disclosure. It should be noted that process 1300 or any step thereof could be performed on, or provided by, any of the devices shown in FIGS. 7-8. For example, process 1300 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1300 may be incorporated into or combined with one or more steps of any other process or embodiment described herein.

FIG. 13 depicts a process 1300 for determining how to handle an operation that may interrupt a media viewing experience. The process 1300 may be followed preemptively prior to watching media when a media guidance application has information about an upcoming interruption. In addition, process 1300 may be followed when media viewing has commenced when an interruption is imminent, and the media guidance application attempts to handle the operation to avoid an interruption to the media viewing experience.

At step 1302, control circuitry 704 for the media guidance application may receive status information in response to a query for network-connected devices for status information. For example, when media is selected to be viewed, or when control circuitry 704 for the media guidance application is notified of an imminent interruption event, the control circuitry 704 for the media guidance application may send a request to network-connected devices for status information. The request may be sent directly to the devices or via a home assistant 110. The status information may be the information shown in FIG. 3, for example.

Some additional information about the operations may also be helpful, and so at step 1305, the control circuitry 704 for the media guidance application may receive operation information for network-connected devices. The additional operation information may be procedures and details depicted in FIG. 4. Steps 1302 and 1305 may be performed in combination or separately.

The status information can be used by the control circuitry 704 for the media guidance application to determine at step 1310 whether there are any operations in progress at network connected devices. The control circuitry 704 for the media guidance application may determine that an oven is baking based on status information 325 (FIG. 3). If the status information shows that there are no operations in progress, the process 1300 may end.

If there is an operation in progress, the process continues at step 1315 where the control circuitry 704 for the media guidance application may determine whether the operation terminates in a detrimental condition. A detrimental condition may be one that causes an adverse effect to the device or an object associated with the device. For example, a baking operation may need to be handled following a timer end because food in the oven may become burned or overcooked. Thus, for baking operations, the condition may be that it requires response, i.e., 325 (FIG. 3). If, however, there is no detrimental condition, such as a neutral condition caused by a refrigerator ice making cycle 330 (FIG. 3), the process 1300 may end.

Process 1300 may continue with a confirmation of timing of the operation and interruption. At step 1320 the control circuitry 704 for the media guidance application may determine a time for the operation to terminate. The timing details may be obtained using the status information and operation procedures, for example, those shown in FIGS. 3 and 4.

The timing details may be compared against the media activity time period. The media activity time period may be obtained based on metadata for the media asset. The comparison may be used by the control circuitry 704 for the media guidance application at step 1325 to determine whether the termination time interferes with the media consumption or media viewing experience. If there is no overlap between the interruption and media viewing, process 1300 may end. If, however, the media viewing will be interrupted by the interruption, process 1300 may continue with step 1330.

At step 1330 the control circuitry 704 for the media guidance application may determine whether the operation can be delayed. Details about network-connected device operations and handling of the operations may be obtained from operation procedures, e.g., those shown in FIG. 4, which may include information about whether the operation can be delayed. For example, a refrigerator inventory operation, which may be noisy, can be delayed (475 (FIG. 4)). In another example, a food expiration warning by a refrigerator may also be delayed, in some instances depending on the type of food and expiration type (480 (FIG. 4)). In another example, a thermostat temperature change may also be delayed (495 (FIG. 4)).

If the operation can be delayed, at step 1335, the control circuitry 704 for the media guidance application may send a command to the respective network-connected device to delay the operation. Thus, using the examples, above, the control circuitry 704 for the media guidance application may send a command to the refrigerator to delay an inventory operation or an expiration warning. In another example, the control circuitry 704 for the media guidance application may send a command to a thermostat to delay a temperature change so that the viewer is not affected by a change in ambient temperature. If the operation can be delayed, the interruption event can be effectively handled so that it does not disturb the viewer. In some scenarios, the control circuitry 704 for the media guidance application may determine how much time remains in the media viewing experience and send a specific delay command so that the device delays an operation for the 20 minutes remaining in the media activity.

If, however, the operation cannot be delayed, the process may continue at step 1340 where the control circuitry 704 for the media guidance application may determine whether there is a following operation. For example, for an anti-wrinkle dry cycle for a dryer, at the end of the cycle, there may be an air-dry anti-wrinkle cycle that can be added to follow the cycle or an extension of the dry cycle, (e.g., 465, 470 (FIG. 4)). In another example, some types of baking operations may be followed with a cool down and powering off of the oven (440 (FIG. 4)). This may be suitable for roasting vegetables or other hardy items but not suitable for baking a soufflé. Such additional operational details specific to the operation may be useful in handling the operation.

If a following operation is available, the control circuitry 704 for the media guidance application may send, at step 1345, a command to the respective network-connected device to perform the following operation. Thus, for example, the control circuitry 704 for the media guidance application may send a command to the oven to turn off or to the dryer to add an air-dry cycle. In some scenarios, the control circuitry 704 for the media guidance application may determine how much time remains in the media viewing experience and send a specific extension command so that the dryer performs a following air-dry cycle for the 20 minutes remaining in the media activity.

If no operational delay or following operation is available at steps 1330 and 1340, respectively, the control circuitry 704 for the media guidance application may confirm whether the amount of time left in the media activity warrants an interruption. At step 1350, the control circuitry 704 for the media guidance application may determine a time between the end of the operation that may cause an interruption and an end of the media consumption activity. Such determination may be made by the control circuitry 704 for the media guidance application based on operation procedures and status information, such as that shown in FIGS. 3 and 4, together with media asset time from metadata for the media asset.

A threshold amount of time may be set where an interruption could be skipped. For example, if only a minute remains between the interruption and finishing viewing, then perhaps a detrimental condition in a network-connected device may not be critical, and so it could potentially hold. Each type of operation may have a different threshold amount of time. For example, a baking operation for cookies may be one minute whereas baking a roast may be five minutes, an anti-wrinkle dry cycle may be able to sit for three minutes without wrinkling, a wine glass dishwashing cycle may be able to sit for two minutes without developing spots on the glasses, or other threshold for particular operations may be used. Such thresholds may be set by the user or arise from crowd sourced databases, or manufacturer databases for devices.

At step 1355 the control circuitry 704 for the media guidance application may determine whether the time between the operation finishing and the end of media viewing exceeds the threshold for the operation. If the time does not exceed the threshold, the control circuitry 704 for the media guidance application may end the process 1300 and not interrupt the viewer and also not issue any handling commands to the device. A notification about the operation may be displayed for the user following the media viewing activity.

If, however, the threshold is exceeded, at step 1360, the control circuitry 704 for the media guidance application may generate a notification about the operation so that the viewer can intervene. In some scenarios, the media guidance application will send a notification of the operation to another person in the household to intervene.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 13.

Figure 14:
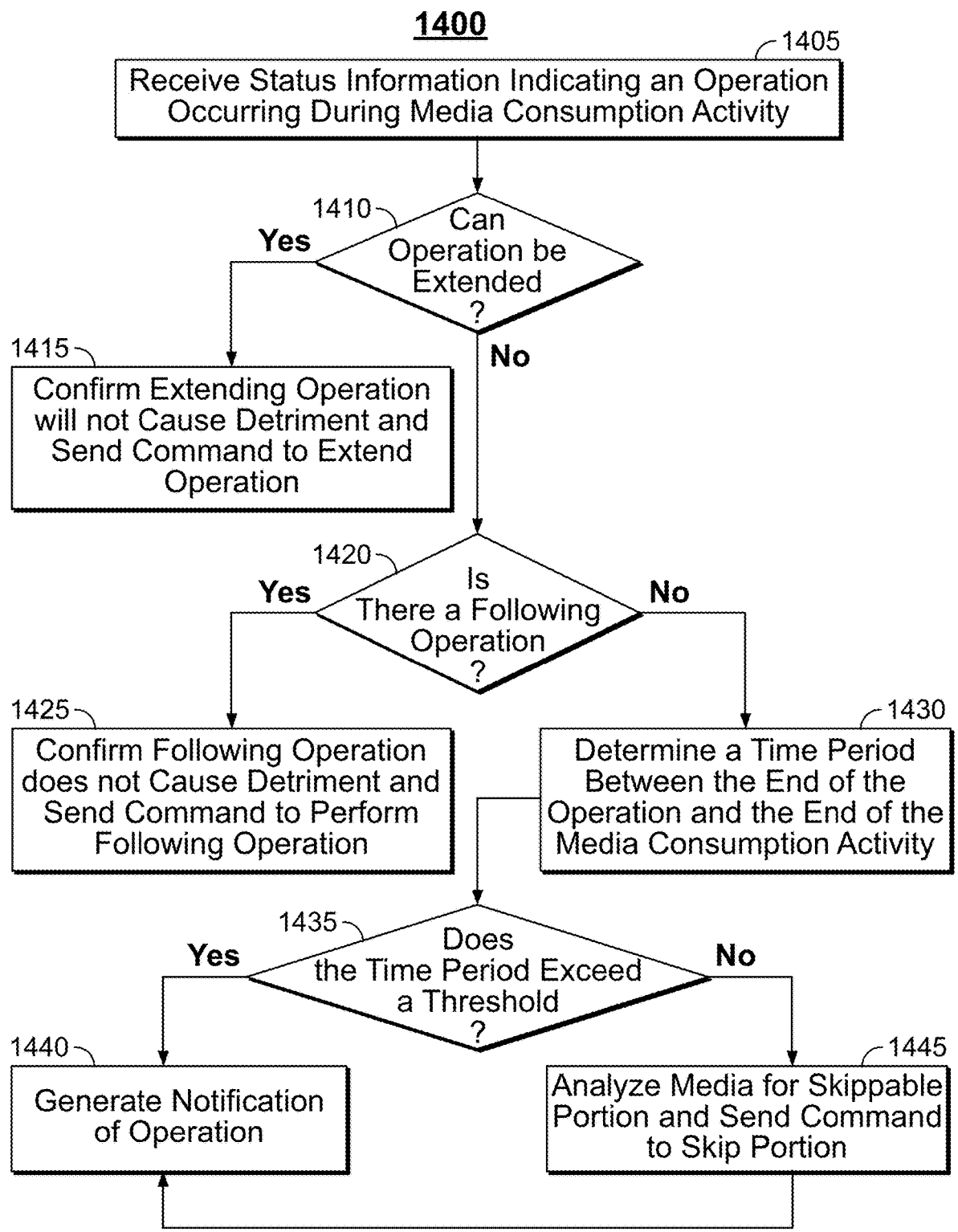

FIG. 14 is a flowchart of illustrative steps of a process 1400 for handling an interruption event by a network-connected device in accordance with some embodiments of the disclosure. It should be noted that process 1400 or any step thereof could be performed on, or provided by, any of the devices shown in FIGS. 7-8. For example, process 1400 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1400 may be incorporated into or combined with one or more steps of any other process or embodiment described herein.

FIG. 14 depicts a process 1400 for handling an interruption to a media viewing activity. For example, in an environment such as that depicted in FIG. 1, a user may view a media asset on screen 100 and there may be devices in the home that may be performing operations that may cause an interruption to viewing the media asset.

At step 1405, control circuitry 704 for a media guidance application may receive status information indicating an operation occurring during a media consumption activity. For example, when media is selected to be viewed, or when control circuitry 704 for the media guidance application is notified of an imminent interruption event, the control circuitry 704 for the media guidance application may send a request to network-connected devices for status information. The request may be sent directly to the devices or via a home assistant 110. The status information may be the information shown in FIG. 3, for example.

At step 1410, the control circuitry 704 for the media guidance application may determine whether the operation can be extended. Extending an operation may include adding time to an operation or delaying the operation for a period of time. Details about operation extensions may be obtained from operation procedures for network-connected devices, such as those shown in FIG. 4. For example, a thermostat temperature schedule may be extended (495 (FIG. 4)).

If the operation can be extended, the control circuitry 704 for the media guidance application may confirm, at step 1415, that extending the operation will not cause detriment to the device and then send a command to the device to extend operation. A detrimental condition to the device or object associated with the device may be one that causes damage or adverse effects to the device or its contents. For example, a baking operation, if extended, may cause food in the oven to burn. If, however, the operation can be extended, such as for a thermostat, the control circuitry 704 for the media guidance application may send a command to the device to extend the operation.

If the operation cannot be extended (or delayed), at step 1420, the control circuitry 704 for the media guidance application may determine whether there is a following operation. For example, for an anti-wrinkle dry cycle for a dryer, at the end of the cycle, there may be an air-dry anti-wrinkle cycle that can be added to follow the cycle or an extension of the dry cycle, (e.g., 465, 470 (FIG. 4)). In another example, some types of baking operations may be followed with a cool down and powering off of the oven (440 (FIG. 4)). This may be suitable for roasting vegetables or other hardy items, but not suitable for baking a soufflé. Such additional operational details specific to the operation may be useful in handling the operation.

If a following operation is available, control circuitry 704 for the media guidance application may confirm, at step 1425, that the following operation does not cause detriment to the device or contents associated with the device and send a command to the respective device to perform the following operation. For example, the control circuitry 704 for the media guidance application may confirm that adding an air-dry cycle to a dryer will not cause a detrimental condition to the dryer or garments before sending a command to add an air-dry cycle.

If no following operation is available, at step 1430, the control circuitry 704 for the media guidance application may determine a time period between the end of the operation and the end of the media consumption activity. If the time period is short, it may not be critical enough to warrant an interruption event.

Thus, at step 1435 the control circuitry 704 for the media guidance application may determine whether the time period exceeds a threshold. A threshold amount of time may be set where an interruption could be skipped. For example, if only a minute remains between the interruption and finishing viewing, then perhaps a detrimental condition in a network-connected device may not be critical, and so it could potentially hold. Each type of operation may have a different threshold amount of time. For example, a baking operation for cookies may be one minute whereas baking a roast may be five minutes, an anti-wrinkle dry cycle may be able to sit for three minutes without wrinkling, a wine glass dishwashing cycle may be able to sit for two minutes without developing spots on the glasses, or other threshold for particular operations may be used. Such thresholds may be set by the user or arise from crowd sourced databases or manufacturer databases for devices.

If the threshold is exceeded, the control circuitry 704 for the media guidance application may generate a notification about the operation at step 1440.

If, however, the threshold is not exceeded, the control circuitry 704 for the media guidance application may analyze the media asset metadata to identify a skippable portion of the media. For example, metadata for a media asset may indicate that there are advertisements or end credits that could be skipped. For such media, the control circuitry 704 for the media guidance application may send a command at step 1445 to skip the skippable portion of the media. In this scenario, the control circuitry 704 for the media guidance application can skip content in the media that may not be a main focus so that the viewer can finish the media viewing activity before the interruption event occurs. When the skipping occurs, the control circuitry 704 for the media guidance application may optionally send a notification at step 1440 so that the viewer knows of the interruption event.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 14.

Figure 15:
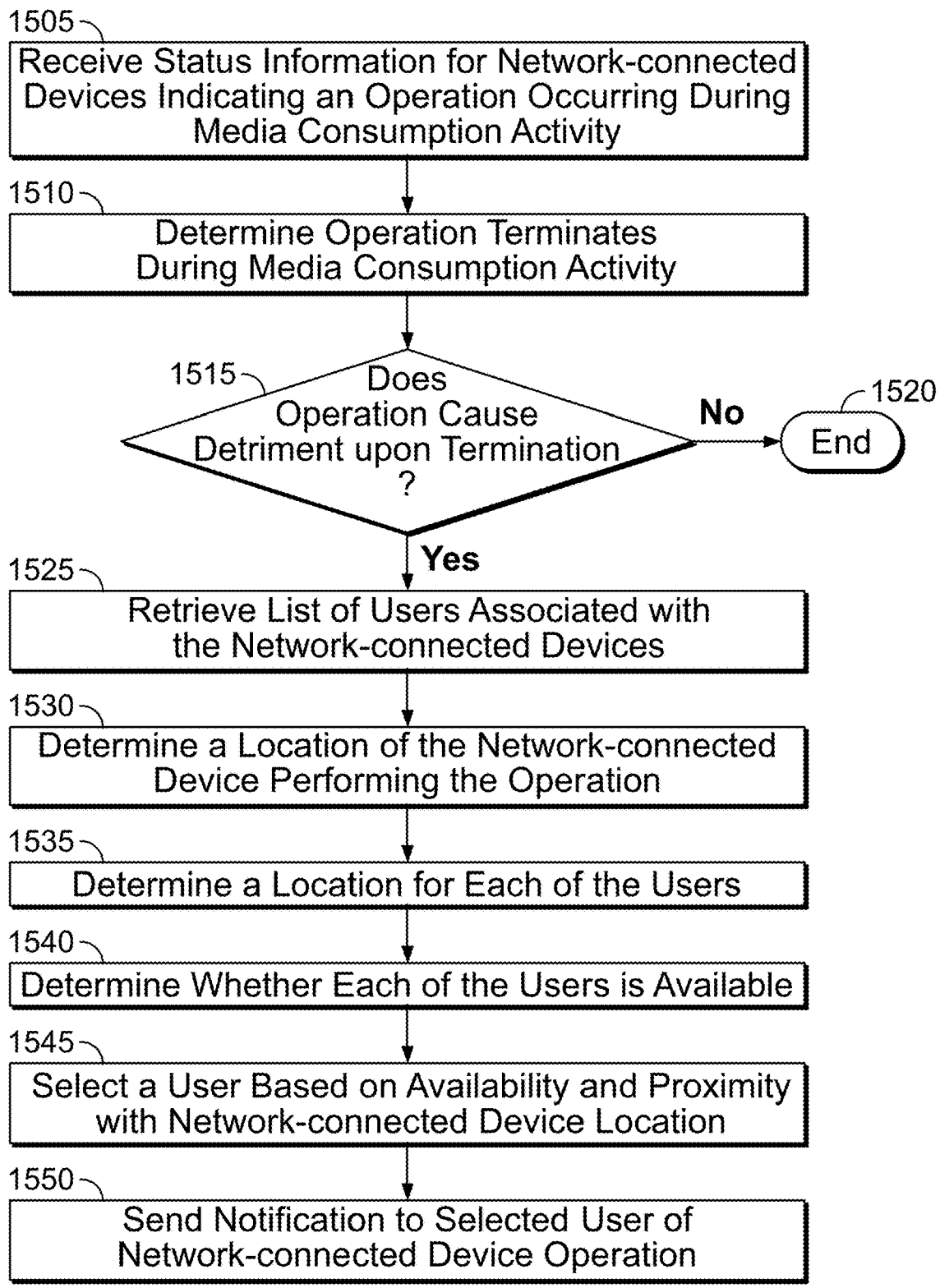
FIG. 15 is a flowchart of an illustrative process for notifying another user of an interruption event in accordance with some embodiments of the disclosure

FIG. 15 is a flowchart of illustrative steps of a process 1500 for notifying another user of an interruption event by a network-connected device in accordance with some embodiments of the disclosure. It should be noted that process 1500 or any step thereof could be performed on, or provided by, any of the devices shown in FIGS. 7-8. For example, process 1500 may be executed by control circuitry 704 (FIG. 7) as instructed by a media guidance application implemented on a user device (e.g., user equipment devices 802, 804, and/or 806 (FIG. 8)) to avoid interruptions in media viewing. In addition, one or more steps of process 1500 may be incorporated into or combined with one or more steps of any other process or embodiment described herein.

FIG. 15 depicts a process 1500 for avoiding an interruption event during media viewing by sending a notification to another user in the household or nearby vicinity. For example, if one person in a household is viewing a media asset, a notification about an oven timer and baking operation may be sent to another person in the household so that the other person can remove items in the oven without disturbing the media viewer.

At step 1505, control circuitry 704 for a media guidance application may receive status information for network-connected devices indicating an operation occurring during media consumption activity. The status information may be received by the control circuitry 704 for the media guidance application while the viewer is watching media or at the time media is selected for viewing. The status information may include device and operation details, such as those shown in FIG. 3. For example, status information may show that an oven is performing a baking operation.

At step 1510, the control circuitry 704 for the media guidance application may determine that an operation terminates during the media consumption activity. Thus, the control circuitry 704 for the media guidance application may use time details from the status information (FIG. 3) along with metadata for the media asset to identify an overlap in the operation termination time and the media viewing. For example, the control circuitry 704 for the media guidance application may determine that an oven timer for a baking operation is due to go off before a media activity has completed.

At step 1515, the control circuitry 704 for the media guidance application may determine whether the operation causes detriment to the associated device upon termination of the operation. Detrimental conditions may be determined based on operation procedures, such as those shown in FIGS. 3 and 4. For example, an oven generally has a condition requiring a response and requires intervention (325 (FIG. 3), 440 (FIG. 4)).

Some operations, however, do not cause a detrimental condition. For example, a refrigerator ice making cycle ends in a neutral condition 330 (FIG. 3). For such types of benign operations, the process 1500 may end at step 1520 and nothing needs to be done to handle the operation.

However, if an operation does require a response to avoid a detrimental condition at the termination of the operation, at step 1520, the control circuitry 704 for the media guidance application may retrieve a list of users associated with the network-connected devices. The users associated with the network-connected devices, or IoT devices in a household, may be identified by querying a home assistant 110 for associated users or by requesting users from the respective devices.

In order to find a suitable user to notify about handling the operation, the control circuitry 704 for the media guidance application may determine at step 1530 a location of the network-connected device performing the operation. For example, an oven used for baking cookies may be located in a kitchen, and a dryer running an anti-wrinkle cycle may be located in a basement.

At step 1535, the control circuitry 704 for the media guidance application may determine a location for each of the users that are associated with the network devices. For example, there may be multiple persons in a household and they may be scattered in different locations. User locations may be obtained using a home assistant 110 which may have an audio or video mode capable of identifying when users are in various rooms. In other scenarios, a user may be located using a smartphone associated with the user.

At step 1540, the control circuitry 704 for the media guidance application may select a user based on availability of the respective user and proximity of the user with network-connected device location. For example, a user that is very close to the device may have a calendar setting for a conference call that may indicate that the user is not available. In another example, a user may not have their smartphone on which may indicate that they are not available. In another example, a home assistant device 110 may detect that the user is motionless and may be sleeping, and thus, not available. Availability and proximity to the device location may be a basis for selecting a user to notify of the interruption event.

At step 1550, the control circuitry 704 for the media guidance application may send a notification to the selected user of network-connected device operation so that the selected user can intervene when the operation has finished. Notifications to the user may be sent to a user's smartphone or other display device associated with the user as a text message or electronic message. If the selected user has a home assistant 110 nearby, the home assistant may display a screen notification or provide an audio message about the operation.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 7-8 could be used to perform one or more of the steps in FIG. 15.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for preventing media viewing interruptions, the method comprising:
   receiving, from a network-connected device in a home of a user, operation status information of an operation being performed by the network-connected device;
   determining a time period for playback of a media asset in the home of the user;
   determining whether performance of the operation will finish during the time period for playback of the media asset;
   in response to determining that the performance of the operation will finish during the time period for playback of the media asset, determining, based on the respective operation status information, whether the operation requires an action from the user;
   in response to determining that the operation requires an action from the user, generating a notification for presentation about the operation; and
   in response to determining that the operation does not require an action from the user, delaying generating a notification for presentation about the operation until completion of the time period for the playback of the media asset.

2. The method of claim 1, further comprising:
sending a query to a database of network-connected device operation procedures, the query requesting information associated with handling completion of the operation and a condition of the network-connected device associated with the operation completion,
wherein the condition on the network-connected device further comprises a condition that is detrimental to the network-connected device or an object associated with the network-connected device.

3. The method of claim 1, further comprising,
determining, based on the operation status information, whether the operation can be extended to terminate after completion of the time period for the playback of the media asset;
in response to determining that the operation can be extended, transmitting a command to the network-connected device to extend the operation currently performed by the network-connected device; and
in response to determining that the operation cannot be extended, generating for presentation a notification about the operation.

4. The method of claim 3, wherein the command to the network-connected device to extend the operation currently performed by the network-connected device, comprises one of a group of commands to:
increase the time period to perform the operation, add a secondary operation following the operation, power off the network-connected device, and pause the operation by the network-connected device.

5. The method of claim 4, further comprising:
selecting the command to increase the time period to perform the operation, in response to determining that increasing the time period to perform the operation does not cause the network-connected device detriment.

6. The method of claim 4, further comprising:
selecting the command to add a secondary operation following the operation, in response to determining that the operation has an associated secondary operation, wherein the secondary operation does not cause the network-connected device detriment.

7. The method of claim 3, further comprising:
in response to determining that the operation cannot be extended, determining a remaining time period for completion of the operation;
comparing the remaining time period with a first threshold time period; and
in response to determining that the remaining time period is less than the first threshold time period, generating for presentation a notification of the remaining time period.

8. The method of claim 3, further comprising:
in response to determining that the operation cannot be extended, calculating an end time period, the end time period being between the end time for performance of the operation and completion of the playback period of the media asset;
comparing the end time period with a second threshold time period;
in response to determining that the end time period is less than the second threshold time period, analyzing metadata for the media asset to identify a portion of the media asset suitable for skipping, the portion having a duration more than the second threshold time period; and
skipping the portion of the media asset suitable for skipping.

9. The method of claim 1, wherein the network-connected device comprises one of the group of: washing machine, oven, dishwasher, dryer, and refrigerator;
wherein the operation type comprises one of the group of: cleaning, washing, heating, cooling, freezing, treating, and baking; and
wherein an operation procedure for each of the respective operation types comprises details for a respective time, interactivity, reaction, alarm, related operations, intervention, and post-operation handling.

10. The method of claim 1, further comprising:
responsive to selection of the media asset, initiating a request for status information from any network-connected device in the home of the user, the request comprising a query for an operation in progress and a start time for the respective operation in progress; and
querying a database of network-connected device operation procedures for information associated with each of the operations in progress, the information comprising a time period for the operation in progress, and a condition of the network-connected device at completion of the operation in progress, the condition indicating whether the network-connected device requires intervention.

11. A system for preventing media viewing interruptions, the system comprising:
input/output (I/O) interface circuitry configured to receive a user input; and
control circuitry configured to:
receive selection of a media asset for playback from a user;
receive from a network-connected device in a home of the user, operation status information of an operation being performed by the network-connected device;
determine a time period for playback of the media asset;
determine whether performance of the operation will finish during the time period for playback of the media asset;
in response to determining that the performance of the operation will finish during the time period for playback of the media asset, determine, based on the respective operation status information, whether the operation requires an action from the user;
in response to determining that the operation requires an action from the user, generate a notification for presentation about the operation; and
in response to determining that the operation does not require an action from the user, delay generation of a notification for presentation about the operation until completion of the time period for the playback of the media asset.

12. The system of claim 11, wherein the control circuitry is further configured to:
send a query to a database of network-connected device operation procedures, the query requesting information associated with handling completion of the operation and a condition of the network-connected device associated with the operation completion,
wherein the condition on the network-connected device is a condition that is detrimental to the network-connected device or an object associated with the network-connected device.

13. The system of claim 11, wherein the control circuitry is further configured to:

determine based on the operation status information whether the operation can be extended to terminate after completion of the time period for the playback of the media asset;

in response to determining that the operation can be extended, transmit a command to the network-connected device to extend the operation currently performed by the network-connected device; and in response to determining that the operation cannot be extended, generate for presentation a notification about the operation.

14. The system of claim 13, wherein the command to the network-connected device to extend the operation currently performed by the network-connected device, comprises one of a group of commands to:

increase the time period to perform the operation, add a secondary operation following the operation, power off the network-connected device, and pause the operation by the network-connected device.

15. The system of claim 14, wherein the control circuitry is further configured to:

select the command to increase the time period to perform the operation, in response to determining that increasing the time period to perform the operation does not cause the network-connected device detriment.

16. The system of claim 14, wherein the control circuitry is further configured to:

select the command to add a secondary operation following the operation, in response to determining that the operation has an associated secondary operation, wherein the secondary operation does not cause the network-connected device detriment.

17. The system of claim 13, wherein the control circuitry is further configured to:

in response to determining that the operation cannot be extended, determine with the control circuitry a remaining time period for completion of the operation;

compare with the control circuitry the remaining time period with a first threshold time period; and in response to determining that the remaining time period is less than the first threshold time period, generate for presentation a notification of the remaining time period.

18. The system of claim 13, wherein the control circuitry is further configured to:

in response to determining that the operation cannot be extended, calculate with the control circuitry an end time period, the end time period being between the end time for performance of the operation and completion of the playback period of the media asset;

compare the end time period with a second threshold time period;

in response to determining that the end time period is less than the second threshold time period, analyze metadata for the media asset to identify a portion of the media asset suitable for skipping, the portion having a duration more than the second threshold time period; and skip the portion of the media asset suitable for skipping.

19. The system of claim 11, wherein the network-connected device comprises one of the group of: washing machine, oven, dishwasher, dryer, and refrigerator;

wherein the operation type comprises one of the group of: cleaning, washing, heating, cooling, freezing, treating, and baking; and wherein an operation procedure for each of the respective operation types comprises details for a respective time, interactivity, reaction, alarm, related operations, intervention, and post-operation handling.

20. The system of claim 11, wherein the control circuitry is further configured to:

in response to selection of the media asset, initiate a request for status information from any network-connected device in the home of the user, the request comprising a query for an operation in progress and a start time for the respective operation in progress; and query a database of network-connected device operation procedures for information associated with each of the operations in progress, the information comprising a time period for the operation in progress, and a condition of the network-connected device at completion of the operation in progress, the condition indicating whether the network-connected device requires intervention.

\* \* \* \* \*